US010007115B2

(12) United States Patent
Greenhalgh et al.

(10) Patent No.: US 10,007,115 B2
(45) Date of Patent: Jun. 26, 2018

(54) PLACEMENT OF A COMPUTER GENERATED DISPLAY WITH FOCAL PLANE AT FINITE DISTANCE USING OPTICAL DEVICES AND A SEE-THROUGH HEAD-MOUNTED DISPLAY INCORPORATING THE SAME

(71) Applicant: DAQRI, LLC, Los Angeles, CA (US)

(72) Inventors: Philip Greenhalgh, Battle (GB); David Crosby, Oxford (GB); David Hayes, Rye (GB)

(73) Assignee: DAQRI, LLC, Los Angeles, CA (US)

( * ) Notice: Subject to any disclaimer, the term of this patent is extended or adjusted under 35 U.S.C. 154(b) by 0 days. days.

(21) Appl. No.: 14/825,148

(22) Filed: Aug. 12, 2015

(65) Prior Publication Data

US 2017/0045742 A1    Feb. 16, 2017

(51) Int. Cl.
*G02B 27/01*    (2006.01)

(52) U.S. Cl.
CPC ..... *G02B 27/0172* (2013.01); *G02B 27/0176* (2013.01); *G02B 2027/0154* (2013.01)

(58) Field of Classification Search
CPC ............ G02B 27/0172; G02B 27/0101; G02B 27/0176
USPC ................................................ 359/630, 637
See application file for complete search history.

(56) References Cited

U.S. PATENT DOCUMENTS 4,220,400 A     9/1980  Vizenor
4,232,943 A *  11/1980  Rogers ..................... G02B 9/34
                                                            359/726
4,545,646 A    10/1985  Chern et al.
4,767,186 A     8/1988  Bradley, Jr. et al.
4,968,117 A    11/1990  Chern et al.
5,050,946 A     9/1991  Hathaway et al.
(Continued)

FOREIGN PATENT DOCUMENTS

EP        785457 A2   7/1997
EP       1798592 A2   6/2007
(Continued)

OTHER PUBLICATIONS

R. Paschotta, article on Lenses; The Encyclopedia of Laser Physics and Technology, 1. edition Oct. 2008, Wiley-VCH, ISBN 978-3-527-40828-3.*

(Continued)

*Primary Examiner* — Zachary Wilkes
(74) *Attorney, Agent, or Firm* — Franklin & Associates International Inc; Matthew F. Lambrinos

(57) ABSTRACT

Fixed position optical devices for displaying augmented reality images are provided herein. In one embodiment an optical device includes a AIIE having a waveguide that reflects a computer generated image along a central viewing axis, the computer generated image being received from an image generator optically coupled to the waveguide, and a fixed lens assembly for coupling a background image with the computer generated image to create the augmented reality display, the fixed lens assembly including a proximal lens disposed on one side of the waveguide, the proximal lens being fixedly spaced apart from the waveguide at a first distance, and a distal lens disposed on an opposing side of the AIIE from the one side, the distal lens being fixedly spaced apart from the waveguide at a second distance.

28 Claims, 18 Drawing Sheets

(56) References Cited

U.S. PATENT DOCUMENTS

| | | | |
|---|---|---|---|
| 5,076,664 A | 12/1991 | Migozzi | |
| 5,202,950 A | 4/1993 | Arego et al. | |
| 5,535,025 A | 7/1996 | Hegg | |
| 5,886,822 A | 3/1999 | Spitzer | |
| 5,991,085 A | 11/1999 | Rallison et al. | |
| 6,057,966 A | 5/2000 | Carroll et al. | |
| 6,157,291 A | 12/2000 | Kuenster et al. | |
| 6,204,974 B1 * | 3/2001 | Spitzer | G02B 27/017 359/630 |
| 6,222,677 B1 | 4/2001 | Budd et al. | |
| 6,236,511 B1 | 5/2001 | Brown | |
| 6,288,846 B1 | 9/2001 | Stoner, Jr. | |
| 6,353,503 B1 | 3/2002 | Spitzer et al. | |
| 6,563,648 B2 * | 5/2003 | Gleckman | G02B 27/0172 359/630 |
| 6,577,411 B1 * | 6/2003 | David | G02B 3/10 351/159.41 |
| 6,607,286 B2 | 8/2003 | West et al. | |
| 6,671,100 B1 | 12/2003 | McRuer | |
| 6,714,174 B2 | 3/2004 | Suyama et al. | |
| 6,829,095 B2 | 12/2004 | Amitai | |
| 6,926,420 B2 | 8/2005 | Sung | |
| 7,079,318 B2 | 7/2006 | Shikama et al. | |
| 7,209,097 B2 | 4/2007 | Suyama et al. | |
| 7,336,244 B2 | 2/2008 | Suyama et al. | |
| 7,418,202 B2 | 8/2008 | Biernath et al. | |
| 7,446,943 B2 * | 11/2008 | Takagi | G02B 17/004 359/630 |
| 7,506,987 B2 | 3/2009 | Nilsen | |
| 7,513,674 B1 | 4/2009 | Donahue | |
| 7,576,916 B2 | 8/2009 | Amitai | |
| 7,639,208 B1 | 12/2009 | Ha et al. | |
| 7,656,585 B1 | 2/2010 | Powell et al. | |
| 7,686,497 B2 | 3/2010 | Kropac et al. | |
| 7,688,347 B2 | 3/2010 | Dolgoff | |
| 7,703,931 B2 | 4/2010 | Nilsen | |
| 7,876,489 B2 | 1/2011 | Gandhi et al. | |
| 7,936,519 B2 | 5/2011 | Mukawa et al. | |
| 7,944,616 B2 | 5/2011 | Mukawa | |
| 7,991,257 B1 | 8/2011 | Coleman | |
| 8,384,999 B1 | 2/2013 | Crosby et al. | |
| 8,964,292 B1 | 2/2015 | Marason et al. | |
| 2001/0033440 A1 | 10/2001 | Togino | |
| 2002/0021461 A1 | 2/2002 | Ono et al. | |
| 2002/0070904 A1 | 6/2002 | Okuyama | |
| 2003/0169397 A1 | 9/2003 | Reichow | |
| 2003/0184868 A1 | 10/2003 | Geist | |
| 2005/0094292 A1 | 5/2005 | Cahall | |
| 2006/0119794 A1 | 6/2006 | Hillis et al. | |
| 2006/0126179 A1 | 6/2006 | Levola | |
| 2006/0132914 A1 | 6/2006 | Weiss et al. | |
| 2007/0008624 A1 * | 1/2007 | Hirayama | G02B 27/0081 359/630 |
| 2007/0177275 A1 | 8/2007 | McGuire, Jr. | |
| 2009/0051879 A1 | 2/2009 | Vitale et al. | |
| 2009/0167651 A1 | 7/2009 | Minano et al. | |
| 2010/0103078 A1 | 4/2010 | Mukawa et al. | |
| 2010/0149073 A1 | 6/2010 | Chaum | |
| 2010/0278480 A1 | 11/2010 | Vasylyev | |
| 2010/0290127 A1 | 11/2010 | Kessler et al. | |
| 2010/0321409 A1 | 12/2010 | Komori et al. | |
| 2011/0007277 A1 | 1/2011 | Solomon | |
| 2011/0050655 A1 | 3/2011 | Mukawa | |
| 2011/0083741 A1 | 4/2011 | Munro | |
| 2011/0083742 A1 | 4/2011 | Munro | |
| 2011/0155331 A1 | 6/2011 | Lopin | |
| 2011/0157600 A1 | 6/2011 | Lyon | |
| 2011/0213664 A1 | 9/2011 | Osterhout et al. | |
| 2011/0221656 A1 | 9/2011 | Haddick et al. | |
| 2011/0226332 A1 | 9/2011 | Ford et al. | |
| 2011/0227813 A1 | 9/2011 | Haddick et al. | |
| 2011/0255303 A1 | 10/2011 | Nichol et al. | |
| 2011/0286222 A1 | 11/2011 | Coleman | |
| 2012/0002295 A1 | 1/2012 | Dobschal et al. | |
| 2012/0147038 A1 | 6/2012 | Perez et al. | |
| 2013/0147686 A1 | 6/2013 | Clavin | |
| 2013/0235191 A1 | 9/2013 | Miao | |
| 2013/0242392 A1 * | 9/2013 | Amirparviz | G02B 27/0172 359/485.05 |
| 2014/0153102 A1 | 6/2014 | Chang | |
| 2015/0205126 A1 * | 7/2015 | Schowengerdt | G09G 5/02 345/633 |
| 2016/0109708 A1 | 4/2016 | Schowengerdt | |

FOREIGN PATENT DOCUMENTS

| | | |
|---|---|---|
| EP | 1736812 B1 | 4/2010 |
| RU | 2069835 C1 | 11/1996 |
| WO | 2002099509 A1 | 12/2002 |
| WO | 2007014371 A2 | 2/2007 |
| WO | 2007019138 A1 | 2/2007 |
| WO | 2008/109420 A2 | 9/2008 |
| WO | 2008110942 A1 | 9/2008 |
| WO | 2010033859 A2 | 3/2010 |
| WO | 2010/062481 A1 | 6/2010 |
| WO | 2010106248 A1 | 9/2010 |
| WO | 2010112393 A1 | 10/2010 |
| WO | 2010123934 A1 | 10/2010 |
| WO | 2011113071 A1 | 9/2011 |
| WO | 2011/130715 A2 | 10/2011 |
| WO | 2011124897 A1 | 10/2011 |
| WO | 2017027139 A1 | 2/2017 |
| WO | 2018/009885 | 1/2018 |

OTHER PUBLICATIONS

Aye T M, "Miniature Guided Light Array Sequential Scanning Display for Head Mounted Displays," Final Report to US Army CECOM, May 15, 1998. Retrieved on-line from http://handle.dtic.mil/100.2/ADA350745.

GB Patent Application GB1200321.6 specification and drawings, filed Jan. 9, 2011, at UK Intellectual Property Office, to Cerr Limited, Inventors: Crosby, David Nicholas et al.

UK Intellectual Property Office, Combined Search and Examination Report under Sections 17 and 18(3) of UK Patents Act 1977, dated May 8, 2012, issued on corresponding GB Patent Application GB1200312.6,to Cerr Limited, Inventors: Crosby, David Nicholas et al.

International Search Report and Written Opinion dated Nov. 2, 2017 on International Patent Application No. PCTUS1741228 in the name of Daqri LLC.

* cited by examiner

PLACEMENT OF A COMPUTER GENERATED DISPLAY WITH FOCAL PLANE AT FINITE DISTANCE USING OPTICAL DEVICES AND A SEE-THROUGH HEAD-MOUNTED DISPLAY INCORPORATING THE SAME

CROSS REFERENCE TO RELATED APPLICATIONS

N/A

TECHNICAL FIELD

The present technology pertains to augmented display devices, and more specifically, but not by way of limitation, to devices that provide for the placement of an augmented display (e.g., image). Additionally or alternatively, embodiments relate to see-through head-mounted displays, such as glasses or helmets, which enable optical merging of computer generated and real world scenes.

SUMMARY

According to one aspect, the present technology is directed to an optical device providing an augmented reality display, comprising: (a) a augmented image insertion element (AIIE) that reflects a computer generated image (CGI) along a central viewing axis, the CGI being receivable from an image generator optically coupled to the AIIE; and (b) a fixed lens assembly for coupling a background image with the computer generated image to create the augmented reality display, the fixed lens assembly comprising: (i) a proximal static fixed lens disposed on one side of the AIIE, the proximal lens being fixedly spaced apart from the AIIE at a first distance; and (ii) a distal static fixed lens disposed on an opposing side of the AIIE from the one side, the distal lens being fixedly spaced apart from the AIIE at a second distance.

According to another aspect, the present technology is directed to a device comprising: (a) a frame that is configured to be worn on a head of an individual; and (b) two optical devices disposed on the frame, one of the two optical devices for each eye of the individual, wherein each of the optical devices comprises: (i) a AIIE comprising a waveguide that reflects a CGI along a central viewing axis, the CGI being receivable from an image generator optically coupled to the waveguide; and (ii) a fixed lens assembly for coupling a background image with the CGI to create the augmented reality display, the fixed lens assembly comprising: (1) a proximal static fixed lens disposed on one side of the waveguide, the proximal lens being fixedly spaced apart from the waveguide at a first distance; and (2) a distal static fixed lens disposed on an opposing side of the AIIE from the one side, the distal lens being fixedly spaced apart from the waveguide at a second distance.

According to some embodiments, the present technology is directed to an optical device, comprising: (a) a waveguide for directing a computer generated image into central viewing axis of an eye; and (b) one or more static fixed lenses positioned both in front of and behind the waveguide, the one or more lenses positioned behind of the waveguide being pre-configured to shift an apparent focus of the CGI from infinity to a finite distance, the one or more lenses positioned in front of the waveguide being pre-configured to nullify an overall focusing power of the optical device such that a focal plane of objects viewed through the optical device by the eye are unchanged.

According to another aspect, there is provided a method of manufacturing an optical device providing an augmented reality display. The method can comprise providing a AIIE that reflects a CGI along a central viewing axis; optically coupling an image generator to the AIIE, the CGI being receivable from the image generator; and forming a fixed lens assembly for coupling a background image with the CGI to create the augmented reality display; wherein forming the fixed lens assembly comprises providing a proximal static fixed lens, providing a distal static fixed lens, disposing the proximal fixed lens on one side of the AIIE, the proximal fixed lens being fixedly spaced apart from the AIIE at a first distance; and disposing the distal fixed lens on an opposing side of the AIIE from the one side, the distal lens being fixedly spaced apart from the AIIE at a second distance.

Advantageously, the present technology provides a quality and reliable viewing experience of the optically merged computer generated and real world images.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
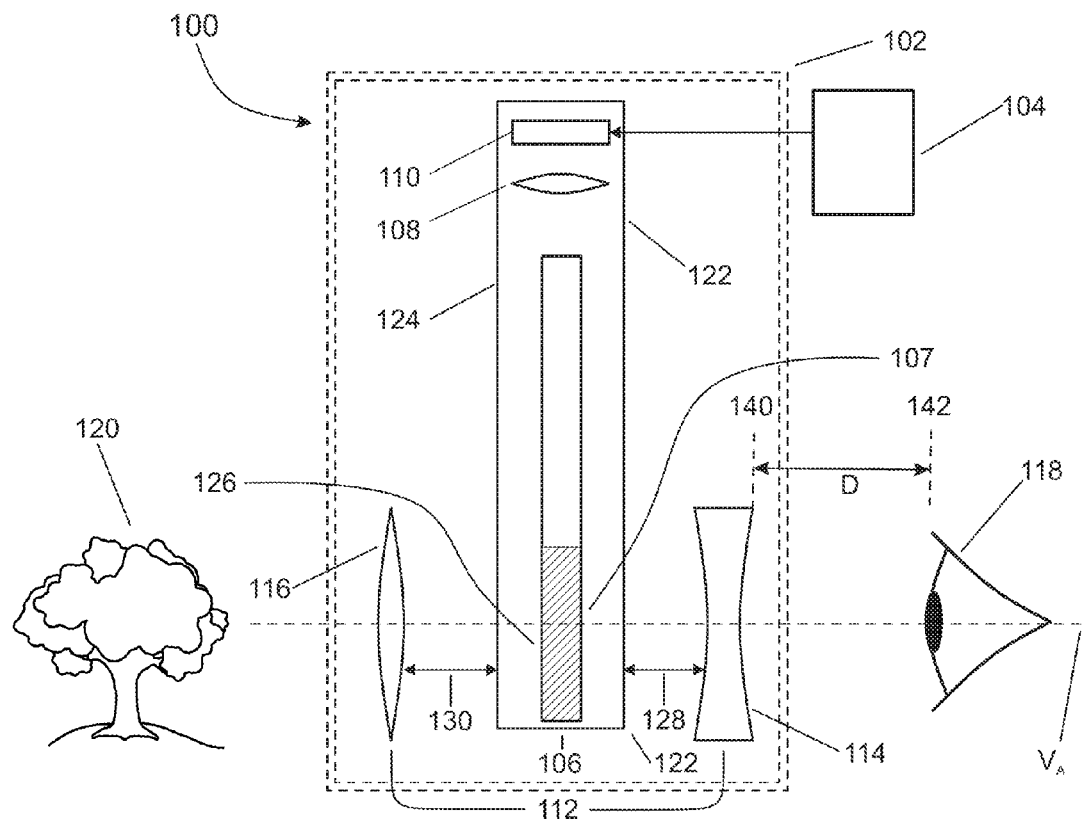
FIG. 1 illustrates an exemplary embodiment of an apparatus, constructed in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

As background, the see-through head mounted displays (HMDs), also referred to as an augmented reality display, can be configured to optically merge real world scenes and CGIs to give an augmented reality experience. Historically, there have been problems with these types of HMDs because there are many geometric and ocular requirements that have to be satisfied to give a comfortable experience without eyestrain.

Augmented reality displays provide users with views which combine a first view, image or scene, typically of the real world with a second image, often created artificially by a computer. When combined with appropriate software and control systems such displays can provide for enhanced information about the real world or introduce synthetic, computer generated objects as though they were present in the real world. A popular term used to describe such applications of see-through head-mounted displays, given the interaction between computer generated and real entities is augmented reality.

There are a number of methods for creating augmented reality display systems. For example, a single computer generated image can present a digital fusion of the real world, as captured by digital cameras, and augmented objects, overlaid by a computer in the digital images which are then sent to a display in front of the viewer. However, this method is limited in that the visual quality of reproduction of the real world images via the capture-redisplay process is usually far inferior to the real world. This approach would often not be referred to as a see-through system augmented reality system. In another approach a projector is used to relay images off a partially-reflective screen and into the eye. The partially-reflective screen is otherwise transparent allowing direct viewing of the real world. This approach can yield high-quality results and has received some applications such as heads-up displays in aviation, however, it is not well suited to compact head-mounted displays owing to the large physical size of optics required if a sufficiently robust user experience is to be achieved. In particular, such systems suffer from fundamental trade-offs between the size of eye-motion-box (which is the position of the eye where viewing of CGIs is possible) and field-of-view.

Another general approach to see-through HMDs uses wave-guiding principles. In these systems a source image is coupled into a transparent slab of material and allowed to propagate along this slab by some distance until it reaches some optical elements which then couple at least a proportion of the light out of the slab and towards the eye of a viewer. To stop the image light from prematurely exiting the slab it is usually arranged so that the light undergoes total internal reflection (TIR) off the walls of the slab until it reaches the optical elements for coupling out to the viewer (reflective surface coatings may also be used in principle, although these may compromise the see-through properties of the slab). As the slab is transparent it is also possible for a viewer to see real-world images through the slab. A wide range of techniques have been described for coupling light in and out of a wave-guiding slab including the use of partially reflective mirrors embedded in the slabs (e.g. U.S. Pat. No. 6,829,095, U.S. Pat. No. 7,936,519), diffraction gratings on the surfaces of the slabs (US 2006/0126179), and slabs carefully tailored sets of freeform surfaces wherein TIR conditions are only maintained for a finite distance before out-coupling is then performed geometrically (WO 2010/123934).

Additional problems exist when matching the CGI focal plane with the physical and real background behind it. The CGIs appear to "float" in mid-air and within limits appear to be aligned with the background image. This is a psychological phenomenon as the CGI is always projected at infinity but the brain does a good job of matching the two planes even if the real image is closer. This accounts for the apparent variable size of the projected image depending on where the wearer looks. For example, if the user looks towards a wall that is a distance of ten meters away, the same CGI will appear larger than the CGI would appear if the user is looking at a wall that is only two meters away.

This is a result of the fixed field of view (FOV) and the floating effect of the projected display. Hence the apparent size of the image gets bigger as the real "background" recedes. It will be understood that there is a limit to the eye and brain's ability to do this if the real background is very close, for example at approximately 30-40 centimeters. In these instances, the eye simply does not have the depth of field to keep both the CGI at infinity and the real image at 40 centimeters sharp, and attempts by the eye and brain to maintain sharp focus can cause eyestrain and a poor user experience.

Some attempts have been made to remedy these issues through the use of what is referred to as a "push and pull" optical system, which dynamically adjusts a position of one or more out focusing lenses relative to an image display slab in order to try and compensate for changes in the distance of the real world image. Using the example above, these systems dynamically alter the position of the out focusing lenses as the field of view moves from meters to two meters. This dynamic movement of the out focusing lenses attempts to compensate for change in distance, adjusting the size and focus of the CGI attempting to ensure a consistent viewing experience, regardless of the distance of the background (e.g., real-world) image. Additional details regarding the use of a dynamic out focusing (push and pull) can be found in United States Patent Application Publication Number 2012/0147038 A1.

While these systems can be used to create augmented reality displays, the systems are complex, expensive, increase maintenance and as described suffer from poor optical image quality. Changes in distance of the background image can reduce the quality of the user experience as described above.

Thus, there is a need in the art for optical devices that can be utilized in HMDs that can provide a quality and reliable viewing experience of the optically merged computer generated and real images. These and other advantages of the present technology will be described in greater detail below.

FIG. 1 is a schematic diagram of an example apparatus 100 for practicing aspects of the present technology. The apparatus 100 generally comprises an optical device 102 and a computer image generator 104. The optical device 102 comprises an AIIE 106 AIIE containing coupling optics 108, a micro-display 110, and an additional static fixed lens assembly 112. In some embodiments, the static fixed lens assembly comprises a proximal lens 114 and a distal lens 116. As will be explained in more detail below, the proximal lens and distal lens are fixed elements such that the optical properties of the lenses cannot be varied. While a particular configuration of proximal and distal fixed lenses are illustrated in FIG. 1, it will be understood that other configurations of proximal and distal lenses are contemplated for use. Other example proximal and distal lens configurations are illustrated and described in greater detail below.

The optical device 102 is configured to be disposed within a predetermined distance D from an eye 118 of a user.

In general, the apparatus 100 is utilized to provide an augmented reality display to the eye 118. This can include coupling, at the eye 118, a background image of a real world scene 120 and an artificially created image generated by the computer image generator 104.

Advantageously, the present technology provides for augmented reality display systems wherein a CGI is optically coupled into the view of the eye via some self-contained element, such as a wave-guiding slab with appropriate out-coupling elements.

This present technology provides a means of shifting the apparent focal plane of CGIs in a see-through display system without significantly altering the focal plane of the see-through real-world image.

To be sure, the present technology is applicable to augmented reality displays, and in some embodiments to see through displays that feature a slab inserted into the optical path of the eye into which the CGI is coupled in somewhere in the unseen periphery and then coupled out using appropriate optical elements integrated into the slab at the location where the slab intersects the viewing path of the eye.

An augmented reality display is achieved by the use of one or more fixed position lenses placed on each side of the AIIE 106, such as the proximal and distal lenses. The proximal lens 114 nearest the eye 118 serves to shift the apparent focus of the CGI from infinity to a finite distance, as determined by the power of the proximal lens 114. The distal lens 116 is placed farthest from the eye 118, on the other side of the AIIE 106. The distal lens 116 is designed such that the overall focusing power when viewing through both proximal and distal lenses is nullified. Thus, the focal plane of objects (both real-world and computer generated) viewed through the optical device 102 is unchanged.

The computer image generator 104 can include any computing device that is capable of providing CGIs (or any image type including video) for output to a display component such as the micro-display 110. The computer image generator 104 in one embodiment includes a microprocessor that is programmed as a video controller. In another example, the computer image generator 104 could include the video card of a gaming console, a personal computer, or a set-top-box—just to name a few.

The computer image generator 104 can be optically coupled to the micro-display 110, with any suitable wired or wireless components that would be known to one of ordinary skill in the art. The micro-display 110 could include any video projecting component that is capable of being housed in a HMD, glasses, helmet and the like. In other embodiments, the apparatus can be removeably (or fixedly) attached to a standard pair of glasses, a helmet, or any other object that would allow the apparatus 100 to be positioned in proper relation to the eye 118.

In some embodiments, the AIIE 106 contains a transparent wave-guiding slab. The wave-guiding slab has parallel faces but may be planar or curved.

The micro-display 110 can be embedded or otherwise collocated with the coupling optics 108 inside the AIIE 106

In some embodiments, the AIIE 106 contains a simple partially reflective surface 107 tilted at some angle (for example, 45 degrees) relative to the central viewing axis $V_A$ of the eye 118 and a projector aimed appropriately to send images to the eye 118 after reflection from the partially reflective surface.

The coupling optics 108 are configured to receive the CGI projected from the micro-display 110 and direct the CGI into an out coupling component 126. In some embodiments, the coupling optics 108 are shaped or otherwise configured to optically adjust the CGI for proper viewing of the CGI by the eye 118.

The AIIE 106 can comprise an out coupling component 126 that comprises, for example, a plurality of partially reflective surfaces that are embedded into the AIIE 106 slab. As mentioned above, many types of out coupling components are known in the art and can be substituted by one of ordinary skill in the art, as informed by the present disclosure.

An example wave-guided AIIE that would adapt for use with the present technology would include a wave-guide that allows for enhanced size of eye-motion-box by using a method of exit pupil expansion. For example, the wave guide could comprise a system of partial-out-coupling repeated multiple times. For example, if we consider a single ray within a ray-optics picture then this ray is coupled out to the eye several times, resulting in several rays distributed at different locations at the exit of the wave-guided system. This may be achieved by using multiple partially reflective surfaces embedded in the waveguide (U.S. Pat. No. 6,829,095, U.S. Pat. No. 7,936,519) or diffractive structures on one of the surfaces of the waveguide which only couple-out a fraction of the light energy at each reflection from the surface (US 2006/0126179).

This is a significant advantage as achieving a larger size of eye-motion-box allows display systems that are usable without setting and maintaining very careful alignment relative to a viewing eye (e.g., as required for general consumer applications). However, in order for repeatedly out-coupled rays to be imaged by the eye 118 as the same point it is advantageous for the out-coupled rays to be parallel. For example, each pixel of the CGI results in a collimated bundle of rays when out-coupled towards the eye. This means that the CGI is focused at infinity.

However, one may not wish to display a CGI with a focal plane at infinity. Instead one may wish to place the focal plane of the CGI at a finite distance from the eye. This may be important given the nature of the CGI so that it better matches likely surroundings. For example, suppose we have a CGI providing additional information for a surgeon in an operating theatre. It would be desirable to place the focal plane of this image at a distance matching the real-world view, around one meter, so that the surgeon does not need to refocus their eyes when shifting their attention between the real world image and the CGI. At the same time one will typically want to keep the focus of the real world image as it would be if no see-through display is used. Thus, the utilization of the proximal and distal lenses is desirable to achieve these ends.

With respect to the configuration of the proximal and distal lenses, the following paragraphs will describe in greater detail specific embodiments of lens configurations. These embodiments are not intended to be limiting, but are merely provided as examples and should be used only as guidelines, as it will be understood that permutations of lens configurations are limitless in number. To be sure, these configurations generally adhere to two basic principles, which stated above are (1) that the proximal lens(es) are positioned behind the waveguide, or AIIE 106, (e.g., between the eye 118 and the AIIE 106), are configured to shift an apparent focus of the CGI from infinity to a finite distance; and (2) that the one or more lenses positioned in front of the waveguide are configured to nullify an overall focusing power of the optical device (apparatus 100) in such a way that a focal plane of a background image viewed through the optical device by the eye is unchanged. The "configuration" of the proximal and distal lenses relates to their individual shapes, which provide the aforementioned functions.

The following embodiments are grouped around several concepts have been created to demonstrate the present technology. However these are not complete and the invention is applicable to modifications that retain the general concepts of the invention. For each concept there are several embodiments, each of which is designed for a different distance for the computer generated image focal plane from the viewing eye. The chosen distances are two meters, 1.5 meters, 1 meter, 0.7 meters and 0.5 meters (others are possible of course). The optical power required in Dioptres, P, is then given by $$P = -\frac{1}{s},$$

where s is the distance from the eye to the computer generated image focal plane.

Prior to describing each of the lens embodiments, a brief description of apparent focus plane shifting will be provided for context. To be sure, a lens placed in front of a viewing eye can be used to shift the apparent plane of focus of an image. For example if one considers a point-like object at infinity viewed with an ideal-diverging lens of focusing power P, and so focal length $$f = \frac{1}{P},$$

then me hot rays from the object which were collimated prior to the lens will become diverging after the lens as though they emanated from a point at a distance f behind the lens. It is noteworthy to mention that for a diverging lens P is negative so f is also negative and so lies farther from the lens. Optically this is identical to having a point-like object at a distance f from the lens (i.e., the lens has shifted the apparent location of the optical focus of the object).

Suppose we have two ideal, thin-lenses of powers $P_1$ and $P_2$. It is well known that for the focusing power of two such ideal lenses placed together is equal to the sum of the individual focusing powers of the lenses, i.e., $P=P_1+P_2$, where P is the total power of the lens system. Thus if we arrange that $P_1=-P_2$ then the total focusing power of a system will be zero—i.e. as if there were no lenses at all. For a system of thin lenses with a finite distance T between the lenses the total power is given by $P=P_1+P_2-P_1P_2T$, which again can give a system with zero overall power if $$P_1 = -\frac{P_2}{1 - P_2 T}.$$

With respect to the apparatus 100, a gap or space 128 and 130 between the AIIE 106 and each of the proximal and distal lenses 114 and 116 is present in practical embodiments. In some embodiments these gaps are spaces that are occupied with air, but this is not necessarily required. In some embodiments, a feature (usually at least a change of optical material) can be utilized if the AIIE 106 relies on wave-guiding (as opposed to a tilted partially reflective mirror embedded in some medium). To be sure, the AIIE 106 has, parallel surfaces, as would be required for most wave-guiding systems (certainly those that provide for exit pupil enlargement).

Light from real-world images (e.g., background images) will pass through both the proximal and distal lenses and the AIIE 106. The apparatus 100 is configured to present a real-world image as close as possible to how it would appear when viewing the real-world image without any intervening optics between the eye 118 and the real-world. As such the proximal and distal lenses are fixedly arranged such that there is no change in a focal plane of real world objects when viewing through the apparatus 100.

Light corresponding to the CGI will exit the AIIE 106 and pass through the proximal lens 114 only. Usually this CCI, immediately after exit from the AIIE 106 will have a focal plane at infinity (so each pixel in the image corresponds to a collimated bundle of rays). The distal lens 116 will then shift the focal plane of the real-world image to a finite distance. If the proximal lens 114 is diverging (negative power) then the focal plane will lie at a finite distance in front of the eye 118, and the CGI will appear as though it is located at a finite distance from the eye 118. Thus, we can arrive at a system for inserting CGIs with focal planes located at a final distance while minimally affected real-world viewing. This again is accomplished using fixed positioned lenses before and after the AIIE 106.

The following embodiments of optical devices will be described independently, but each of the embodiments may utilize a set of common conditions or parameters.

Figure 5:
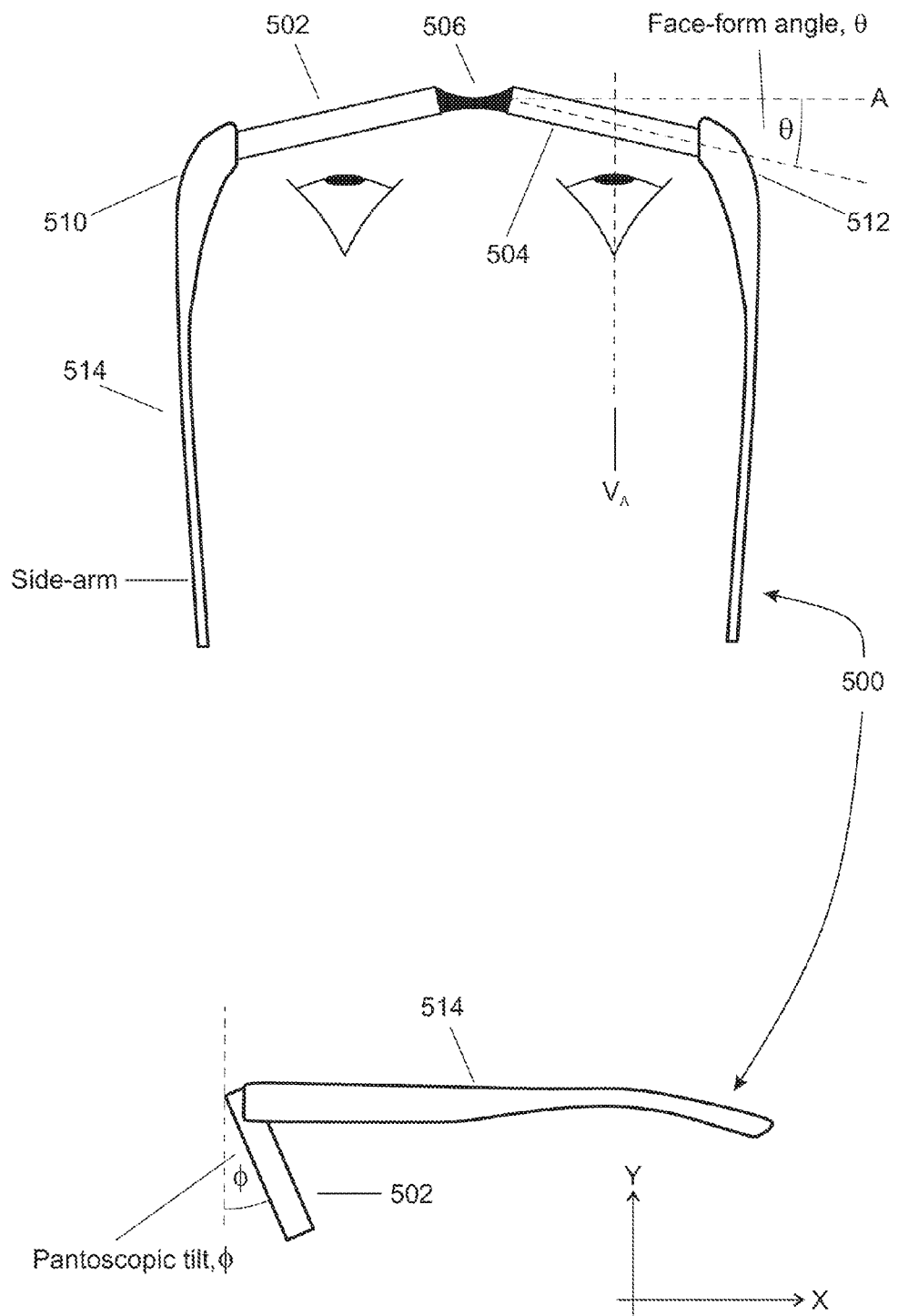
FIG. 5 is a schematic diagram illustrating an embodiment of a head mounted display in the form of eyeglasses having optical devices coupled thereto.

Referring briefly to FIG. 5, a CGI that is output from the AIIE 106 prior to transmission through the proximal lens 114 is defined to have a focal plane $F_P$ at infinity. The real world image is also placed at infinity. A face-form angle θ of approximately five degrees is established for each eye. To be sure, the face form angle θ is measured relative to a reference axis X that is orthogonal to the central viewing axis $V_A$.

A pantoscopic tilt of each lens is utilized to keep an optical axis of lens system aligned with central gaze angle of eye 118. To be sure, each of the optical modules is pivoted relative to the central viewing axis $V_A$ according to the pantoscopic tilt angle φ.

In some embodiments, the material utilized for the proximal and distal lenses is polycarbonate, although other suitable materials that would be known to one of ordinary skill in the art with the present disclosure before them are likewise contemplated for use.

The material for AIIE 106 can be quartz glass, although other suitable materials that would be known to one of ordinary skill in the art with the present disclosure before them are likewise contemplated for use. The AIIE 106 can have a thickness of approximately two millimeters, in some embodiments. External surfaces of AIIE 106 are and parallel to each other.

During design, a wavelength of 550 nanometers can be utilized, although the use of a range of wavelengths, when appropriately weighted, give very similar results but can complicate the merit function required and affect the optimization process. A wavelength of ~550 nm provided similar results to using a weighted range of wavelengths across visible spectrum with advantage of simpler merit function and more efficient optimization process.

A distance $D_1$ from a back surface 140 of the proximal lens 114 to an entrance 142 of the pupil of eye is approximately 15 millimeters.

A distance $D_2$ from the entrance 142 of the pupil of eye to the center-of-rotation of eye 144 is approximately 12 millimeters. Thus, a distance from the back surface of the proximal lens to the eye center-of-rotation is approximately 27 millimeters).

Surfaces of all lenses are described by giving a z-position of the lens surface as a function of coordinates in a plane that is perpendicular to the optical axis of the lens, using either Cartesian (x,y) coordinates or polar (r,θ) coordinates (where $$r = \sqrt{x^2 + y^2} \text{ and } \theta = \arctan\frac{x}{y}.$$

It is noteworthy that the z-axis for this z-position is aligned with the optical axis of the lens and is very close to the central viewing axis $V_A$ of the eye 118 (exactly aligned if the face-form angle θ is zero). Also note that the origin for the coordinate systems for the lens geometry description is located at the lens center, which typically resides on the optical axis for the optical device as a whole.

Finally note that this z-position is measured relative to the z-position at the origin which is defined to be zero. Essentially, each optical surface resides within its own private coordinate system and appropriate transformations are used to then embed the geometry of these surfaces within an overall global coordinate system so that a ray-tracing simulation can be performed with all surfaces (or equivalently transformations can be used to place rays within the coordinate system of each surface).

Figure 2:
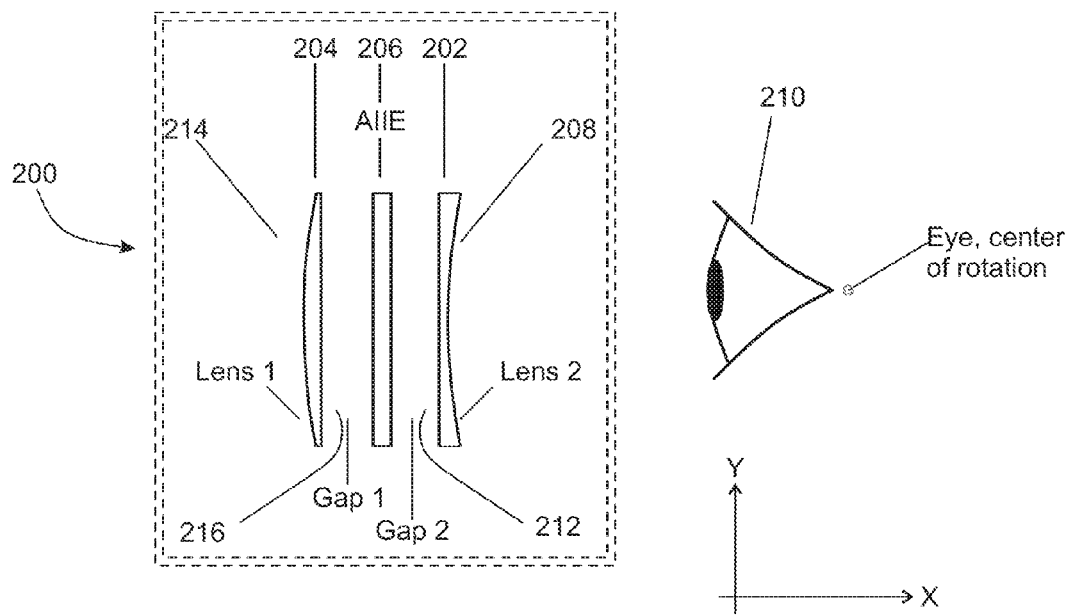
FIG. 2 is a schematic diagram of an example optical device with spherical lenses according to one embodiment.

Turning now to FIG. 2, an embodiment of an optical device 200 with spherical lenses is illustrated. In some embodiments, the optical device 200 includes a proximal lens 202 and distal lens 204. In this embodiment the proximal lens 202 and distal lens 204 each comprise planar surfaces that face a AIIE 206.

The proximal lens 202 has a concave surface 208 that faces the eye 210, and a planar surface 212 that faces the AIIE 206. The distal lens 204 has a convex (spherical) surface 214 that faces away from the AIIE 206, and a planar surface 216 that faces the AIIE 206.

Optimization parameters are the radii of curvature of the non-planar surface of the each of the proximal and distal lenses. Optimization occurs by considering a range of gaze angles over a small (e.g., approximately one degree) field-of-view. This configuration ensures correct performance for central viewing rather than compromised viewing at various gaze angles. An inspection of results can be performed for the optical device 200 over seventy degrees by seventy degrees (horizontal by vertical field of view). To be sure, various fields of view can likewise be utilized, but in some embodiments, a field of view of 70°×70° is utilized.

The relative z-position of the non-planar surface 214 of the distal lens 204, $z_{22}$ (back surface), in polar coordinates (r,θ) measured from the lens origin is given by the equation:

$$z_{22} = \frac{r^2}{R_2 + \sqrt{(R_2^2 - r^2)}}$$

Where $R_2$ is the radius of the spherical-form lens surface 214 and is set via optimization as described above. Similarly the expression for the non-planar surface of the proximal lens 202, $z_{11}$ (front surface), is given by:

$$z_{11} = \frac{r^2}{R_1 + \sqrt{(R_1^2 - r^2)}}$$

Where $R_1$ is the radius of the spherical-form lens surface 208 and is set via optimization and design processes as described infra.

Optimization sought to minimize spherical focusing power variation and cylinder focusing power as a function of gaze angle. The resulting parameters are shown below in Table 1. In these systems lens 1 and lens 2 are assumed to be made from polycarbonate and the AIIE made from quartz glass according to some embodiments. Referring to FIG. 7A-F which illustrates that performance is poor for the CGI as this optical device has limited capacity (too few free parameters) to tailor its focusing properties. Other embodiments provide more optimal performance characteristics.

TABLE 1

| | | | | | |
|---|---|---|---|---|---|
| CGI focal plane (m) | 2 | 1.5 | 1 | 0.7 | 0.5 |
| CGI focus power at eye entrance pupil (D) | −0.5 | −0.67 | −1 | −1.43 | −2 |
| CGI focus power at eye COR (D) | −0.497 | −0.665 | −0.988 | −1.406 | −1.953 |
| Distal lens front surface radius of curvature, $R_1$ (mm) | 1196.20 | 894.54 | 602.79 | 424.22 | 306.01 |
| Distal lens center thickness, $t_1$ (mm) | 2 | 2 | 2 | 2 | 2 |
| Gap 1, Distal lens-AIIE (mm) | 0.25 | 0.25 | 0.25 | 0.25 | 0.25 |
| AIIE thickness, T (mm) | 2 | 2 | 2 | 2 | 2 |

TABLE 1-continued

| | | | | | |
|---|---|---|---|---|---|
| Gap 2, AIIE-Proximal lens (mm) | 0.25 | 0.25 | 0.25 | 0.25 | 0.25 |
| Proximal lens back surface radius of curvature, $R_2$ (mm) | 1194.06 | 892.40 | 600.66 | 422.09 | 303.87 |
| Proximal lens center thickness, $t_2$ (mm) | 1 | 1 | 1 | 1 | 1 |

Figure 3:
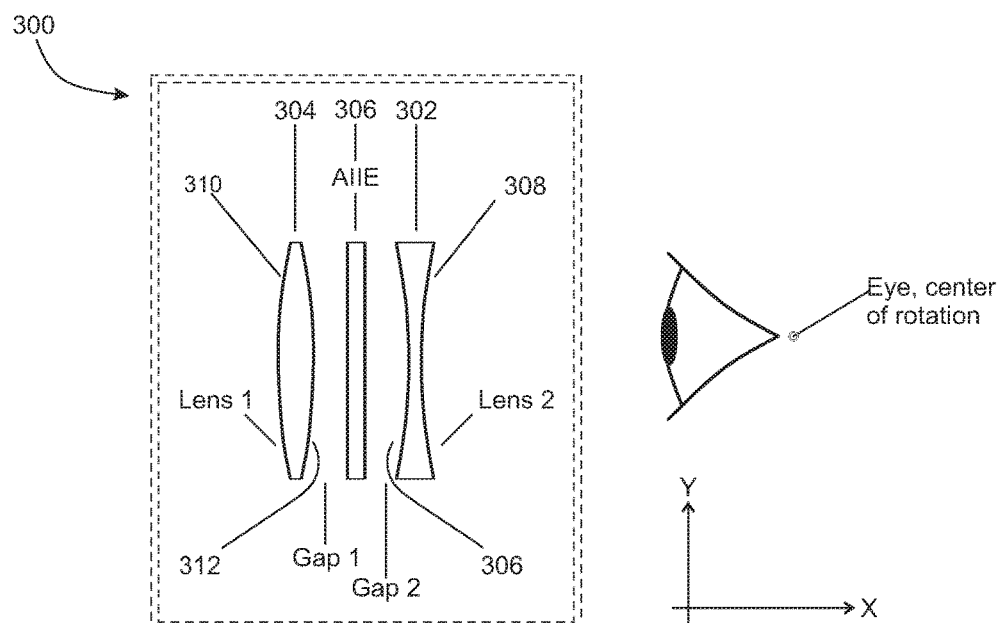
FIG. 3 is a schematic diagram of an example optical device having bi-concave surfaces nearest the eye and bi-convex surfaces farthest from the eye according to one embodiment.

Turning now to FIG. 3, an embodiment of an optical device 300 with bi-spherical lenses is illustrated. More particularly, the lenses have bi-concave surfaces nearest the eye and bi-convex surfaces farthest from the eye. In some embodiments, the optical device 300 includes a proximal lens 302 and distal lens 304.

Optimization parameters are radii of curvatures of the surfaces of the each of the lenses. The optical device 300 is optimized by considering a range of gaze angles over a small one degree field-of-view, as stated above.

The relative z-position of a front surface 306 of the proximal lens 302, $z_{21}$, in polar coordinates (r,θ) measured from the lens origin is given by:

$$z_{21} = \frac{r^2}{R_3 + \sqrt{(R_3^2 - r^2)}}$$

The z-position of the rear surface 308 of lens 2, $z_{22}$ is given by:

$$z_{22} = \frac{r^2}{R_4 + \sqrt{(R_4^2 - r^2)}}$$

Where $R_3$, $R_4$ are the radii of curvature of the lens front and rear surfaces, respectively. To ensure that the lens is bi-convex with set $R_4=-R_3$. the value of $R_3$ (and so $R_4$) is then set via optimization and design processes as described infra.

Similarly the expression for a front surface 310 of the distal lens 304, $z_{11}$ is given by:

$$z_{11} = \frac{r^2}{R_1 + \sqrt{(R_1^2 - r^2)}}$$

And a rear surface 312, $z_{12}$, is given by:

$$z_{12} = \frac{r^2}{R_2 + \sqrt{(R_2^2 - r^2)}}$$

Where $R_2, R_1$ are radii of curvature of the front and rear lens surfaces, respectively. To ensure that the lens is bi-convex with set $R_2=-R_1$. The value of $R_1$ (and so $R_2$) is then set via optimization and design processes as described infra.

Optimization can be used to minimize spherical focusing power variation and cylinder focusing power as a function of gaze angle. Resulting parameters are shown below in Table 2. In these systems lens 1 and lens 2 are assumed to be made from polycarbonate and the AIIE made from quartz glass according to some embodiments. Performance is illustrated in FIG. 11A-F and shows good performance over a wide range of field angle. However, this is at the expense of compactness as the curved surfaces of the lenses, when combined with the flat slab of the AIIE result in a system with much increased thickness compared to that encountered with plano-spherical lenses.

TABLE 2

| | | | | | |
|---|---|---|---|---|---|
| CGI focal plane (m) | 2 | 1.5 | 1 | 0.7 | 0.5 |
| CGI focus power at eye entrance pupil (D) | −0.5 | −0.67 | −1 | −1.43 | −2 |
| CGI focus power at eye COR (D) | −0.497 | −0.665 | −0.988 | −1.406 | −1.953 |
| Distal lens front surface radius of curvature, $R_1$ (mm) | 117.080 | 106.942 | 103.736 | 100.170 | 95.512 |
| Distal lens back surface radius of curvature, $R_2$ (mm) | 129.252 | 121.074 | 124.921 | 130.712 | 138.083 |
| Distal lens center thickness, $t_1$ (mm) | 3 | 3 | 3 | 3 | 3 |
| Gap 1, Distal lens-AIIE (mm) | 6 | 6 | 6 | 6 | 6 |
| AIIE thickness, T (mm) | 2 | 2 | 2 | 2 | 2 |
| Gap 2, AIIE-Lens 2 (mm) | 0.25 | 0.25 | 0.25 | 0.25 | 0.25 |
| Proximal lens front surface radius of curvature, $R_3$ (mm) | 64.088 | 67.486 | 75.429 | 82.149 | 88.296 |
| Proximal lens back surface radius of curvature, $R_4$ (mm) | 60.401 | 62.259 | 66.427 | 68.075 | 67.609 |
| Proximal lens center thickness, $t_2$ (mm) | 1 | 1 | 1 | 1 | 1 |

Figure 4:
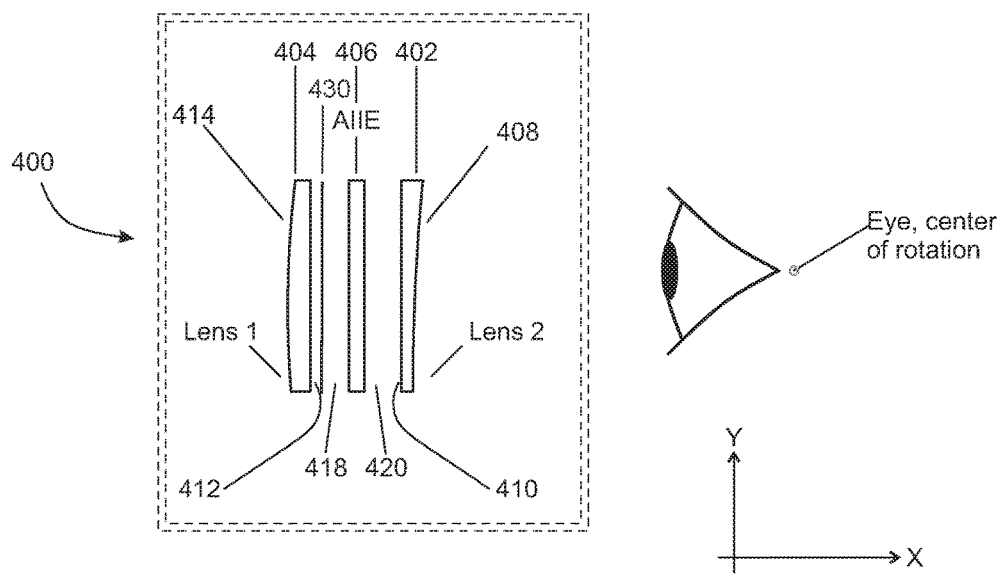
FIG. 4 is a schematic diagram of an example optical device having aspherical lenses with planar surfaces facing a AIIE according to one embodiment.

Turning now to FIG. 4, an embodiment of an optical device 400 with aspherical lenses with planar surfaces facing a AIIE is illustrated. In some embodiments, the optical device 400 includes a proximal lens 402 and distal lens 404, disposed in fixed position relative to a AIIE 406.

Generally, the curved surfaces of the proximal and distal lenses are now aspherical (rather than corresponding to a section of a sphere), meaning that there are additional parameters to describe the (axisymmetric) shape of the lens with more control. This shape change is transformative for the performance of the system. Optimization parameters are radii of curvatures of the surfaces of the proximal and distal lenses.

The proximal lens 402 has a spherical rear surface 408. The relative z-position of the spherical rear surface 408 of proximal lens 402, $z_{21}$, in polar coordinates (r,θ) measured from the lens origin is given by:

$$z_{21} = \frac{r^2}{R_3 + \sqrt{(R_3^2 - r^2)}}$$

The z-position of the aspherical back surface 410 of the proximal lens 402, $z_{22}$ is given by:

$$z_{22} = \frac{r^2}{R_4\left(1 + \sqrt{1 - \frac{(1+\kappa_2)r^2}{R_4^2}}\right)} + B_2 r^2 + B_4 r^4 + B_6 r^6$$

Where $R_3$, $R_4$ are the radii of curvature of the lens surfaces, and $\kappa_2$, $B_2$, $B_4$, $B_6$ are additional parameters inducing aspheric variation of the lens surface shape. Setting $R_3=\infty$ ensures that the back surface is plano (e.g., planar). The values of $R_4$, $\kappa_2$, $B_2$, $B_4$, $B_6$ are set via optimization as described in the optimization and design processes infra.

Similarly the expression for a position rear surface 412 of the distal lens 404, $z_{11}$ is given by:

$$z_{11} = \frac{r^2}{R_1\left(1+\sqrt{1-\frac{(1+\kappa_1)r^2}{R_1^2}}\right)} + A_2 r^2 + A_4 r^4 + A_6 r^6$$

And a curvature of a front surface 414 of the distal lens 404, $z_{12}$, is given by:

$$z_{12} = \frac{r^2}{R_2 + \sqrt{(R_2^2 - r^2)}}$$

Where $R_2$, $R_1$ are radii of curvatures of the lens surfaces, and $\kappa_2$, $A_2$, $A$, $A_6$ are additional parameters inducing aspheric variation of the lens surface shape. The values of $R_1$, $\kappa_1$, $A_2$, $A_4$, $A_6$ are then set via optimization and design processes described infra.

Optimization can be used to minimize spherical focusing power variation and cylinder focusing power as a function of gaze angle. Resulting parameters are shown below in Table 3. In these systems lens 1 and lens 2 are assumed to be made from polycarbonate and the AIIE made from quartz glass according to some embodiments. Performance is illustrated in FIG. 9A-F is very good. In particular this optical device 400 has both good optical performance and the convenience of being relatively flat (since arranging for the proximal and distal lenses to have planar surfaces closest to the AIIE 406 which also has planar surfaces 418 and 420).

TABLE 3

| | | | | | |
|---|---|---|---|---|---|
| CGI focal plane (m) | 2 | 1.5 | 1 | 0.7 | 0.5 |
| CGI focus power at eye entrance pupil (D) | −0.5 | −0.67 | −1 | −1.43 | −2 |
| CGI focus power at eye COR (D) | −0.497 | −0.665 | −0.988 | −1.406 | −1.953 |
| Lens 1 front surface radius of curvature, $R_1$ (mm) | 1204.300 | 885.500 | 595.999 | 421.500 | 303.841 |
| Distal lens back surface radius of curvature, $R_2$ (mm) | ∞ | ∞ | ∞ | ∞ | ∞ |
| Distal lens center thickness, $t_1$ (mm) | 3 | 3 | 3 | 3 | 3 |
| Distal lens, conic constant, $\kappa_1$ | 0 | 0 | 0 | 0 | 0 |
| Distal lens asphere coefficient, $A_2$ | 0 | 0 | 0 | 0 | 0 |
| Distal lens asphere coefficient, $A_4$ | −5.579E−8 | −9.695E−8 | −1.401E−7 | −1.849E−7 | −2.215E−7 |
| Distal lens asphere coefficient, $A_6$ | 5.383E−12 | 1.734E−11 | 2.328E−11 | 4.967e−11 | 2.091E−11 |
| Gap 1, Lens 1-AIIE (mm) | 0.25 | 0.25 | 0.25 | 0.25 | 0.25 |
| AIIE thickness, T (mm) | 2 | 2 | 2 | 2 | 2 |
| Gap 2, AIIE-Lens 2 (mm) | 0.25 | 0.25 | 0.25 | 0.25 | 0.25 |
| Proximal lens front surface radius of curvature, $R_3$ (mm) | ∞ | ∞ | ∞ | ∞ | ∞ |
| Proximal lens back surface radius of curvature, $R_4$ (mm) | 1201.983 | 883.077 | 595.026 | 419.018 | 301.481 |
| Proximal lens center thickness, $t_2$ (mm) | 1 | 1 | 1 | 1 | 1 |
| Proximal lens conic constant, $\kappa_2$ | 0 | 0 | 0 | 0 | 0 |
| Proximal lens asphere coefficient, $B_2$ | 0 | 0 | 0 | 0 | 0 |
| Proximal lens asphere coefficient, $B_4$ | −7.034E−8 | −1.291E−7 | −1.793E−7 | −2.478E−7 | −3.107E−7 |
| Proximal lens asphere coefficient, $B_6$ | 6.819E−12 | 3.048E−11 | 3.649E−11 | 5.155E−11 | 4.491E−11 |

Figure 10:
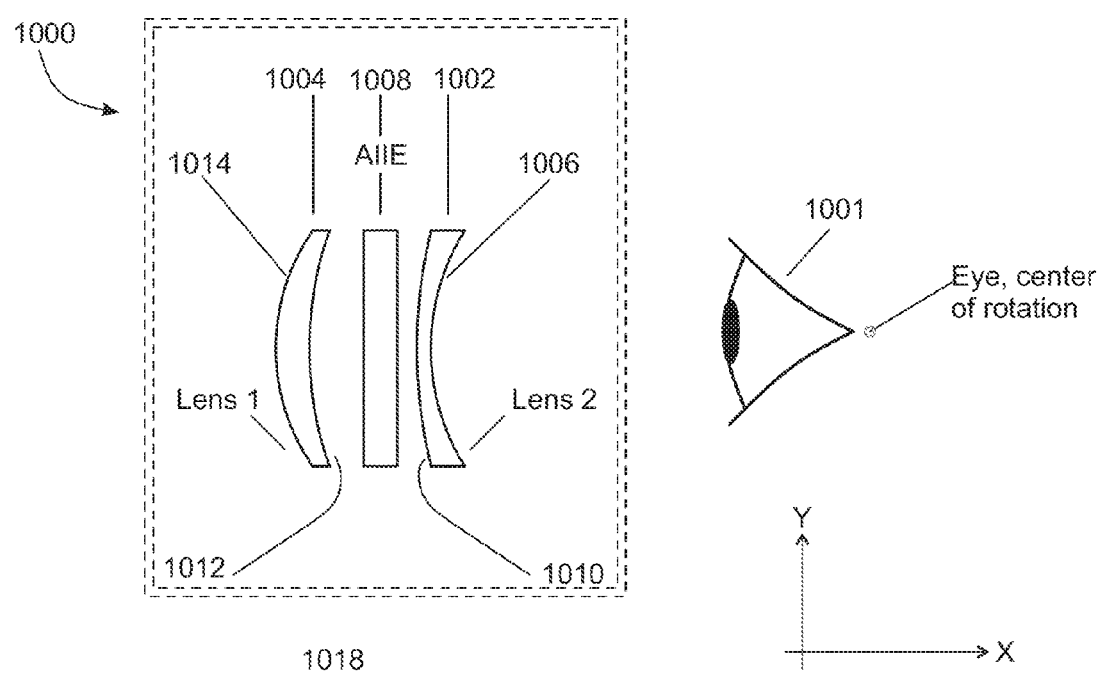
FIG. 10 is a schematic diagram of an example optical device having two meniscus lenses according to one embodiment.
Figure 11A:
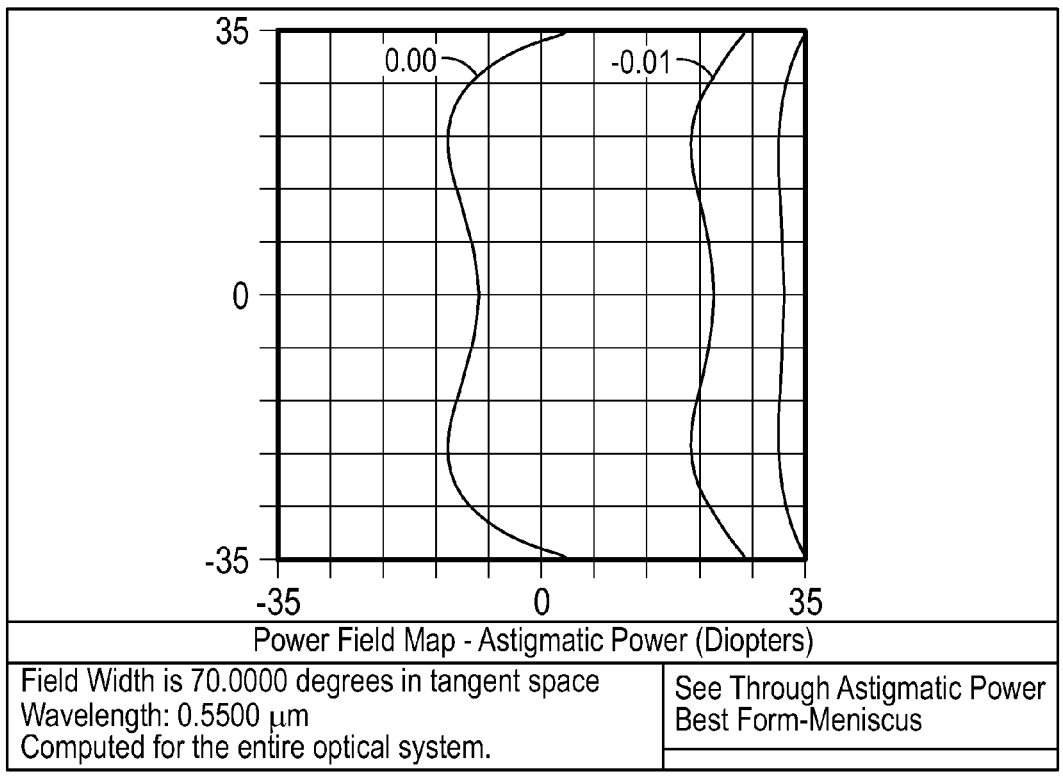
FIGS. 11A-F collectively illustrated performance graphs for the embodiment of FIG. 10.
Figure 11B:
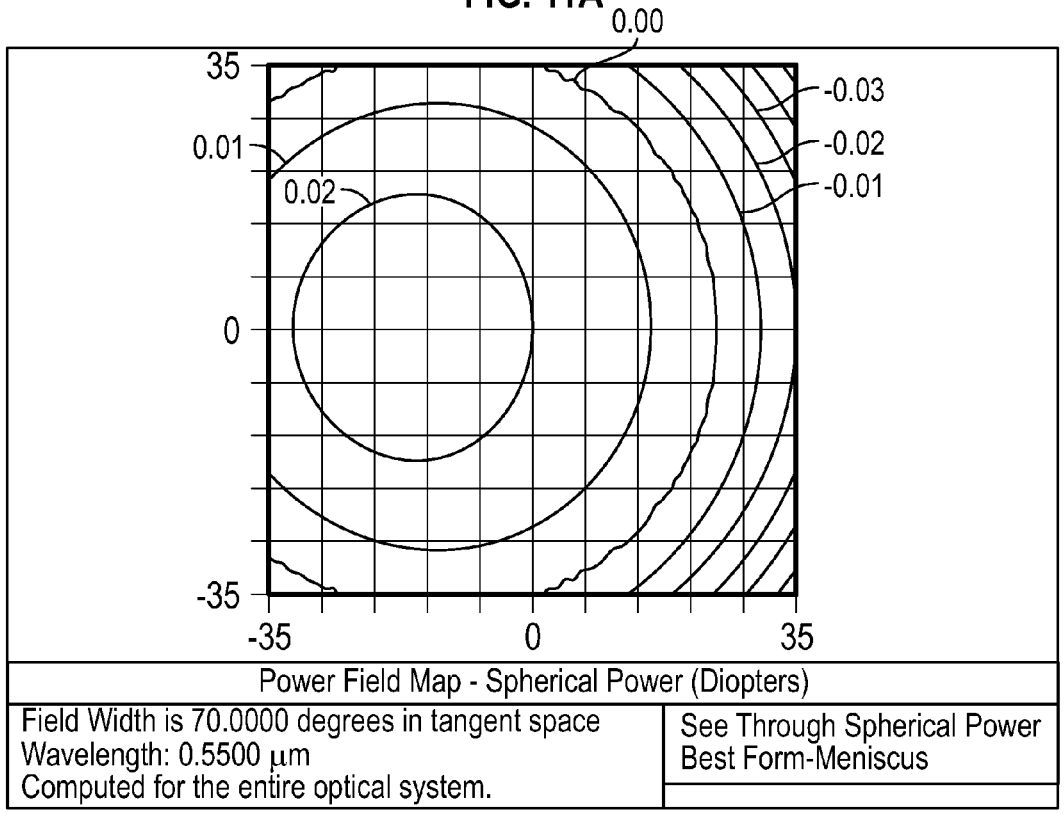
Figure 11C:
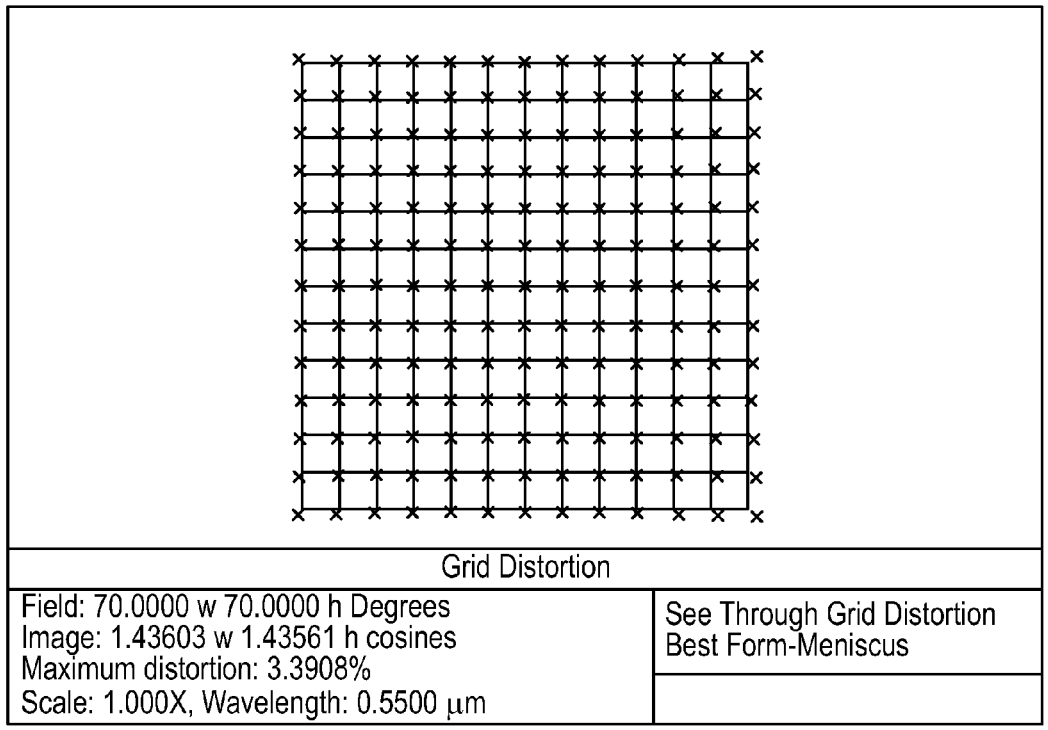
Figure 11D:
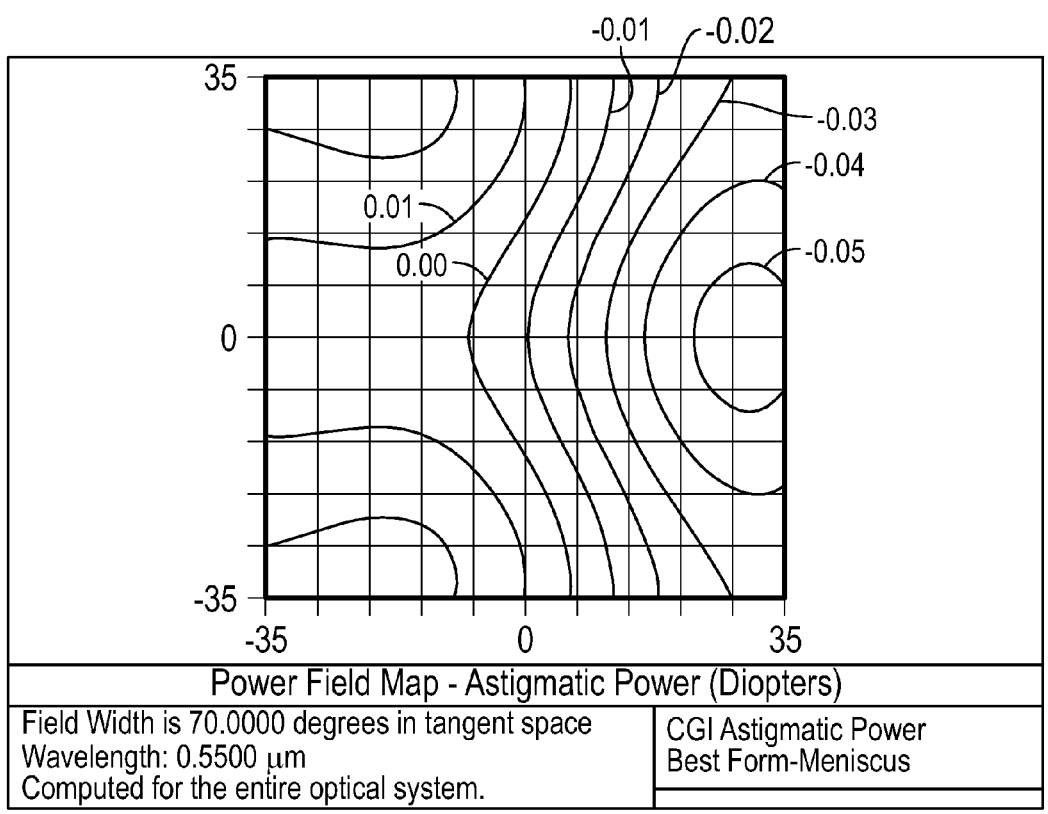
Figure 11E:
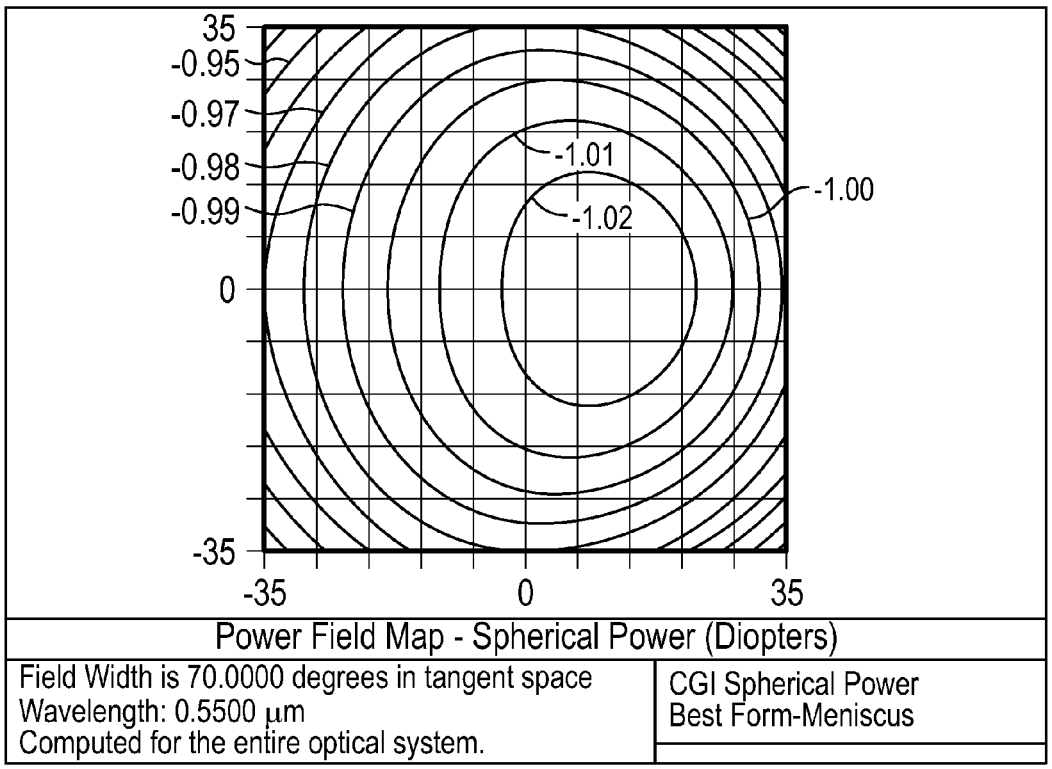
Figure 11F:
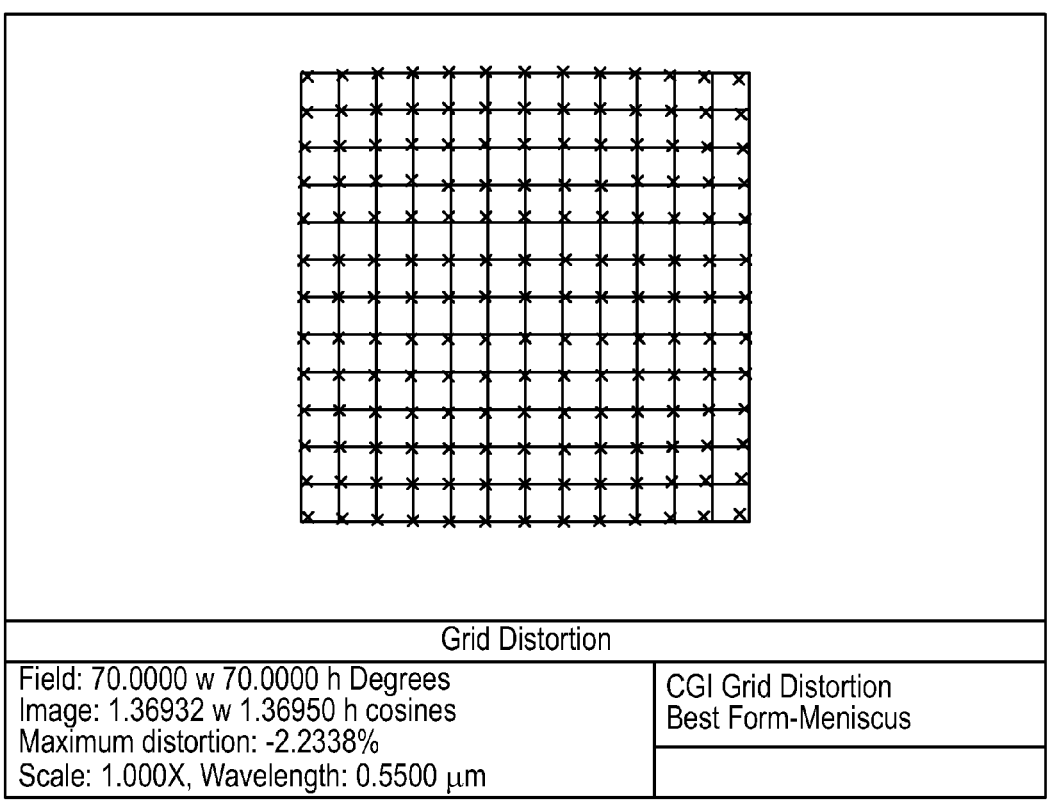

FIG. 10 illustrates yet another embodiment of an optical device 1000. In this embodiment, two spherical lenses wherein for each lens the two surfaces have different radii of curvature. In particular in FIG. 10 a system with meniscus lenses is illustrated as this gives advantageous performance (in meniscus lenses the two surfaces have the same direction of curvature but generally different magnitude). A proximal lens 1002 has a convex surface 1010 that faces an AIIE 1008 and a concave surface 1006 that faces the eye 1001. A distal lens 1004 has a concave surface 1012 that faces the AIIE 1008 and a convex surface 1014 that faces away from the AIIE. To be sure, these lenses are both meniscus lenses.

Performance for this optical device is illustrated in FIG. 11A-F.

Lens Manufacturing Basics

Proximal and distal lenses described herein can be made from a wide range of transparent optical materials including glasses, thermoset plastic resins such as Trivex™ (PPG Industries), and allyl diglycol carbonate (often called CR39) and thermoplastic resins such as polycarbonate and PMMA (poly(methyl methacrylate))—just to name a few.

Lenses can be made by standard methods in optics manufacture, especially those used in ophthalmic optics—including, depending on the material: (1) casting of thermoset plastic resins; (2) Injection molding of thermoplastic resins; (3) glass press molding of glasses; (4) grinding and polishing of plastics or glasses; and (5) diamond turning of plastics or glasses.

Lenses can comprise feature enhanced function coatings such as abrasion resistant coatings and hydrophobic or oleophobic coatings (to repel finger prints and other such contaminants). Normally such coatings would only be required on the external surfaces of the lens system—such as the surface closest to the eye and the surface farthest from the eye, but not limited to these. These coatings may be applied by methods including dip, spray, and spin coating of liquids followed by UV or thermal curing (depending on the coating used).

Lenses can also feature anti-reflection coatings to reduce glare and improve optical transmission. These coatings would be on top of any abrasion resistant coating and would be applied by standard methods, for example via vacuum deposition of inorganic thin-films of controlled thickness.

Photochromic and polarized coatings are also contemplated. Lenses could also be tinted to reduce transmission. In one embodiment applying tint to lens farthest from the eye could be used to reduce the relative intensity of the real world image compared to the CGI.

Optimization and Design Processes

In practice, the performance of optics (e.g., lenses) created for use in accordance with the present technology may be described generally with the above equations. To be sure, these principals hold with the caveat that performance may depend on eye location and gaze angle.

In some embodiments, the introduction of additional degrees of freedom to the parameters of the proximal and distal lenses can be used to provide means for compensating for such variation. To be sure, rather than just specifying the powers of the lenses, the shape of the lens surfaces can be shaped for optimal performance.

When creating the optical device, computational optical design and optimization applications can be used to find values for parameters which provide for improved performance. This can be done using software packages familiar to those skilled in art such as ZEMAX™ (Radiant Zemax LLC).

The manufacturing of the optical device can be optimized using the following set of guidelines, which again, are intended to be descriptive but non-limiting.

During the lens design process, basic system parameters can be specified such as target field of view, location of eye relative to optical device (in particular distance of eye center-of-rotation ("COR") from the back surface of the optical device. In some embodiments, the back surface comprises a surface of the proximal lens which is closest to the eye 118.

Orientation parameters such as face-form angle, thickness and material selection for AIIE 106, design constraints for the proximal and distal lenses (including, for example, a minimum center and edge-thickness), material selection for the proximal and distal lenses, input wavelengths (in practice found that using green light at 550 nanometers is adequate for single lenses), desired focal plane location for CGI.

In some embodiments, the design and optimization process includes an optimization of the optical device (e.g., apparatus) by isolating the proximal lens. This process can include consideration of a location of a focal plane of CGI as output by AIIE 106 (typically but not necessarily at infinity). The target focal plane location can be utilized to set a target optical power of the lens as measured at a suitable location (distance of the real-world object). It is advantageous for this location to be the center of rotation of the eye (COR). Assuming that the focal plane specification is intended for an entrance of the pupil of the eye (which is close to the corneal surface) then a small correction can be applied, $$P' = \frac{P_0}{1 - rP_0},$$

where $P_0$ is the specified power at the entrance pupil, P' is the corresponding target power at the location for simulation measurements, r is the distance from the entrance pupil to the analysis location. In one example, the eye COR is specified with a value of 12 millimeters.

The design system is then used to construct a merit function to measure performance of optical device. This merit function provides a weighted evaluation of the performance of the system and can include such considerations as actual optical power versus target optical power, astigmatism, distortion, and modulation transfer function (MTF—normally as measured in a suitable plane of focus conjugate with the shifted target focal plane rather than a plane of focus conjugate with optical infinity), as measured at either single points or multiple points over target field of view.

In some embodiments, a linear sum of squared difference between a target spherical power and an actual spherical power over a grid of gaze angles covering the target field of view combined with a linear sum of the squared cylinder power (which is a measure of astigmatism in the focus and should ideally be zero) over the same grid of gaze angles. It is noteworthy to mention that the gaze angle is best determined with respect to the eye center-of-rotation, not the eye pupil. This is because high resolution vision is only achieved over a small region of less than five degrees in size. As such it is better to consider optical performance as a function of gaze angle with respect to rotations of the eye about a defined eye center-of-rotation (COR) with the result being that as the eye rotates the view tends to look through different parts of the lens system.

Next, the design application can be used to select free parameters for optimization. In some embodiments, these are values which are varied to achieve improved system performance. Typically these parameters describe the geometry of the lens elements including, but not limited to, the shape of the surfaces of the lenses, their thicknesses, and their positions—just to name a few. In particular, varying the shape of the surfaces of the proximal and distal lenses is an advantageous factor in optimizing the optical behavior of this optical device.

The design application can also utilize additional constraints or design considerations for the optical device, for example, by introducing additional measurements in the system merit function. In one embodiment undesirable component thicknesses can be penalized or judicious selection of parameters such as central lens thickness, can be utilized. These considerations can be used in combination with an inspection to determine if the resulting optimized optical device obeys the specified design constraints. Optimization and/or optical device design constraints can comprise ensuring that lens geometry is manufacturable. For example, the design application can be configured to determine that at all points, lens thicknesses is not too small or too large, as well as ensuring that components do not interfere with each other.

In some embodiments, the design application can be configured to vary free parameters to find more optimal solutions, for example when designing optical devices where the merit function is minimized in value.

According to some embodiments, the design application can be used to verify the results of a simulation. In addition to determining the specific optimization targets as expressed within the merit function, it is also useful to check other measurements to ensure that optimal performance is achieved. For example, one may optimize a system to achieve minimum variation of spherical focusing power and astigmatism as a function of gaze angle and then verify that the resultant optical device delivers good MTF and low distortion.

In some embodiments, the design application can be utilized to perform optimization of the optical device for viewing real-world images, using simulated light transmitting through both the proximal and distal lenses, as well as the AIIE. This approach is essentially similar to that outlined above with the following changes. Only parameters governing the distal lens are varied, such as position and thickness of the distal lens, and the surface shape of the distal lens). The proximal lens parameters and the AIIE parameters are fixed. The target output focal plane is the same as the input focal plane, which in some embodiments is infinity, but may be at finite distances.

It is desirable to have an optical system that is reasonably robust with respect to eye-location in order to provide tolerance for positioning of the optical system on a head of a user. This can be ensured by performing optimization stages, averaging performance over a range of positions for the eye location relative to the optical system. In some embodiments, equivalent results can be achieved by using a large pupil diameter for the eye (e.g. 10 millimeter).

Referring now to FIG. 5, one embodiment of the present technology comprises a head-mounted system with an eyeglasses 500 style form factor. In this arrangement there are two optical devices 502 and 504, one for each eye. Eyeglasses 500 are typically arranged such that a plane of each lens (optical devices here) is rotated slightly about a reference axis A. The reference axis A is orthogonal to the central viewing axis $V_A$.

This helps to wrap the glasses 500 around the natural shape of the head and the parameter governing this is called face-form angle θ. Typically a face-form angle θ of around five degrees is used. It is also usual to introduce a small rotation about the axis substantially aligned to a bridge 506 of the glasses 500. This rotation is called pantoscopic tilt angle φ and is usually in the range of approximately five to fifteen degrees, inclusive.

When considering practical systems it is important to take these geometrical considerations into account. Usually pantoscopic tilt angle φ is introduced along with a vertical shift in position such that it is as though the whole optical system were rotated about the center of rotation of the eye. When this is the case no special treatment is required in optical simulation as the relationship between the optical axis (central viewing axis) of the eye and the optical device remains unchanged. However, this is may not be true for face-form angle θ and consideration for this should be given.

Each of the optical devices 502 and 504 is coupled to its own image generator 510 and 512, respectively, although in some embodiment, only one image generator can be used for both optical devices 502 and 504. The optical devices 502 and 504 can be mounted on the glasses frame 514.

Figure 6:
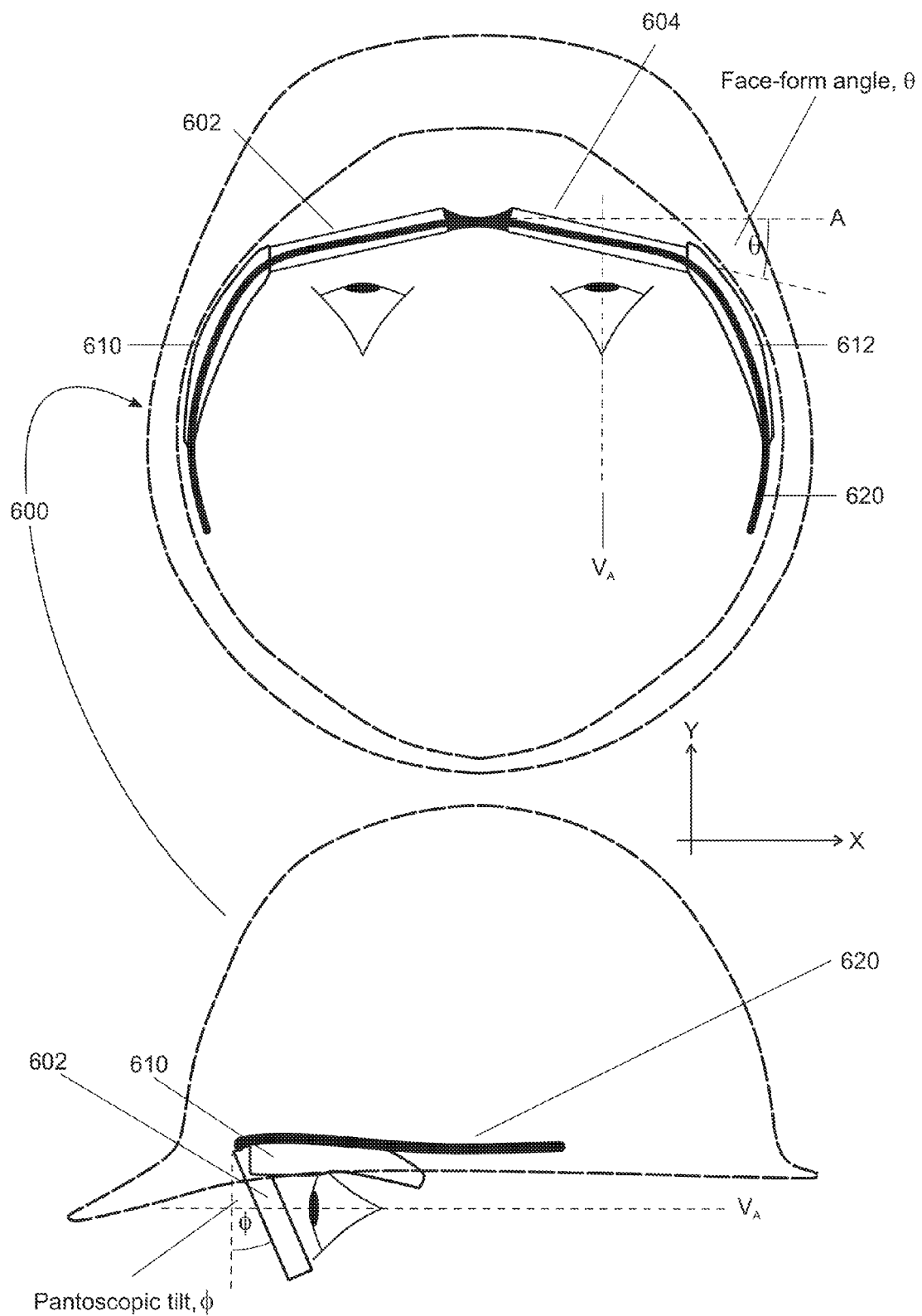
FIG. 6 is schematic diagram Illustrating an embodiment of a head mounted display in the form of an industrial type hard helmet having optical devices coupled thereto.
Figure 7A:
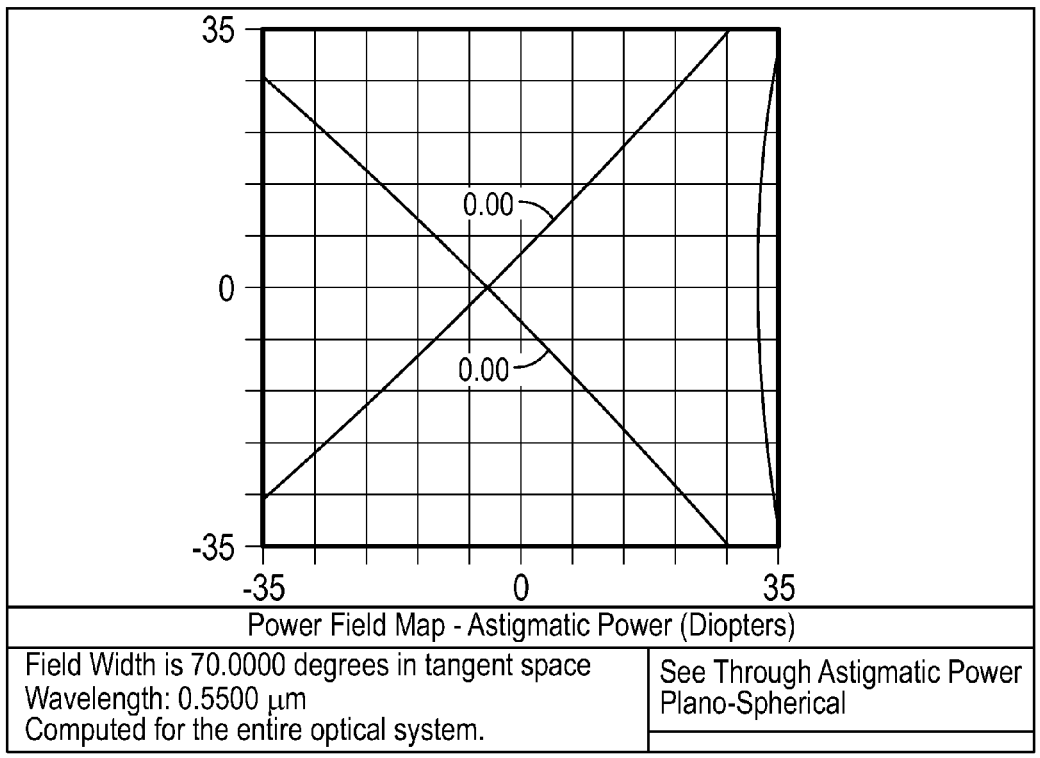
FIGS. 7A-F collectively illustrated performance graphs for the embodiment of FIG. 2.
Figure 7B:
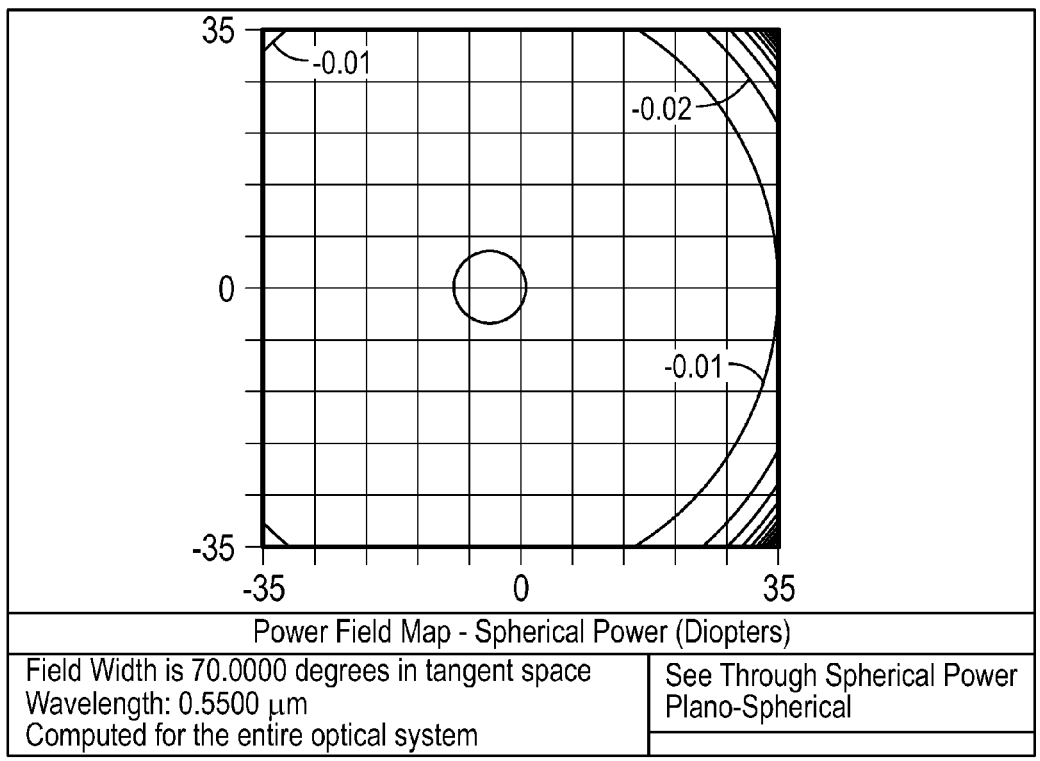
Figure 7C:
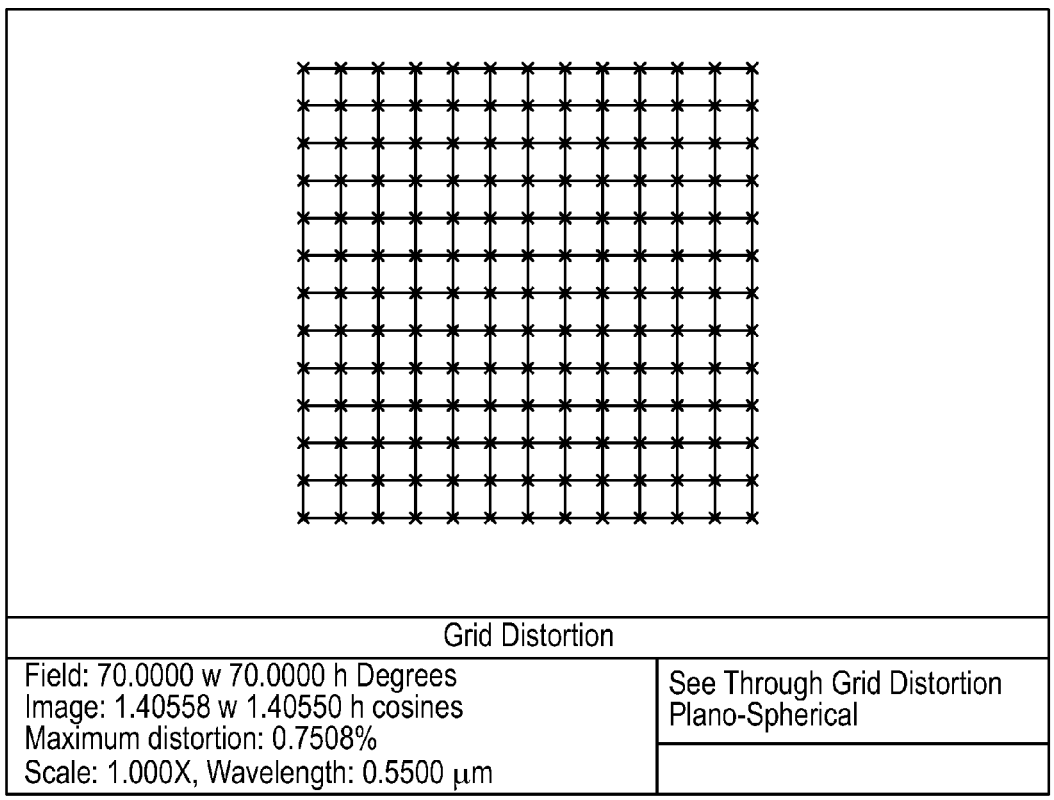
Figure 7D:
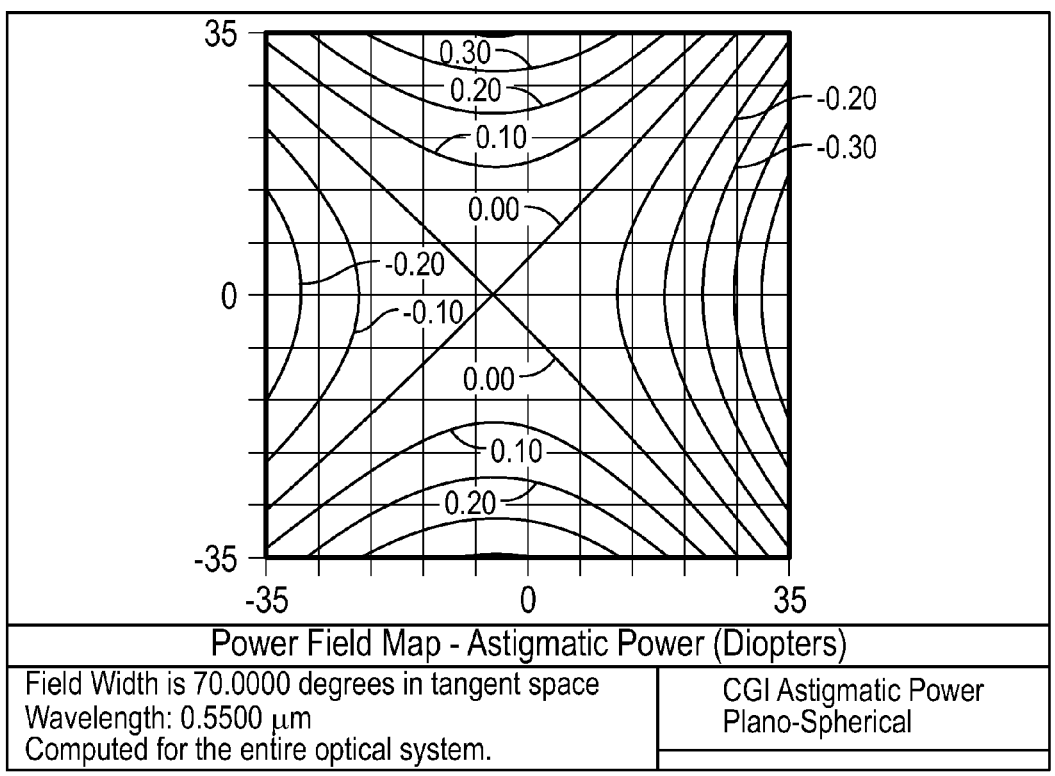
Figure 7E:
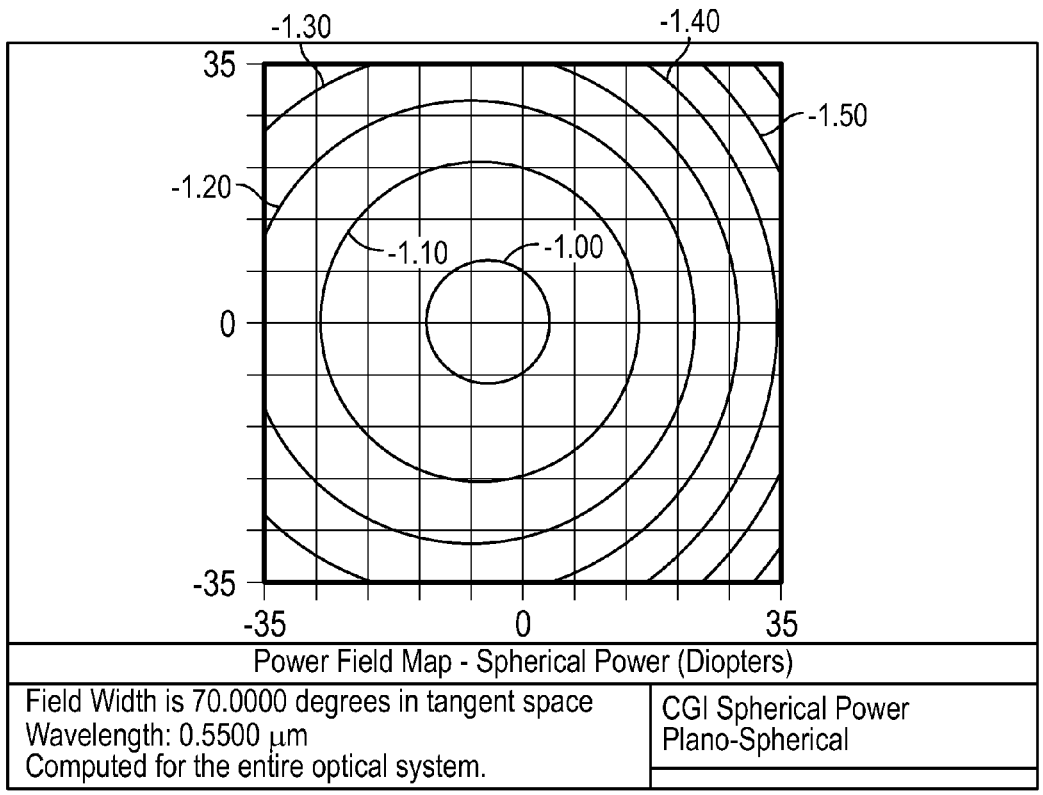
Figure 7F:
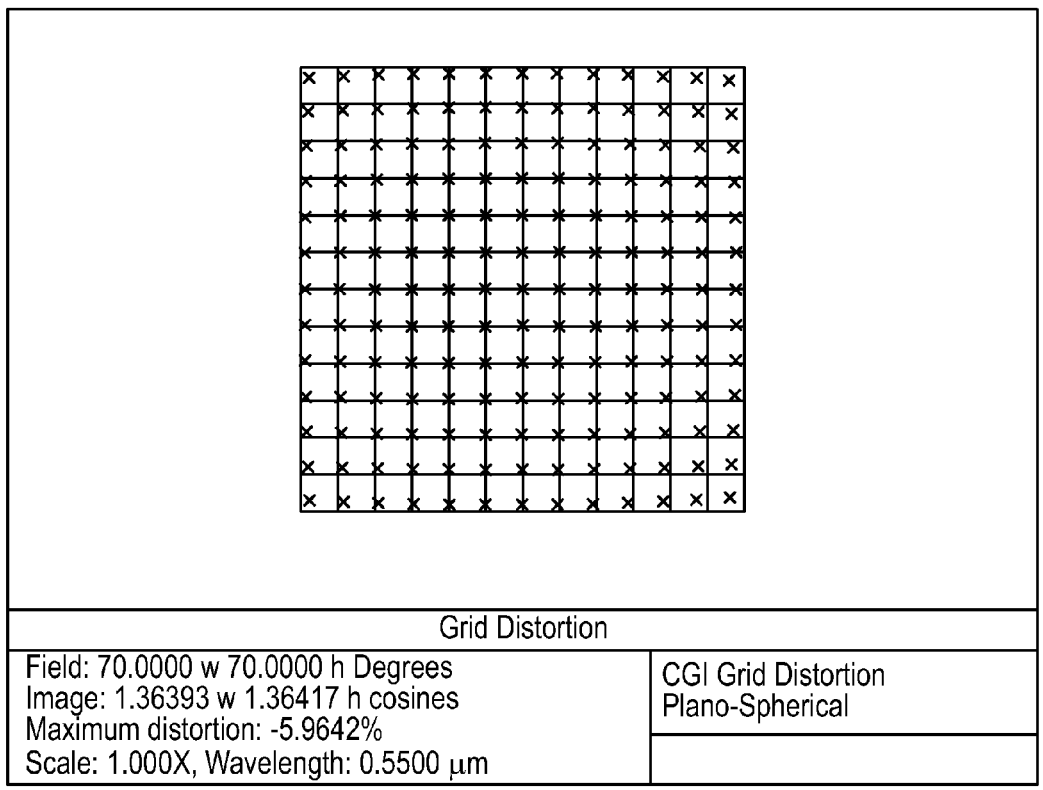
Figure 8A:
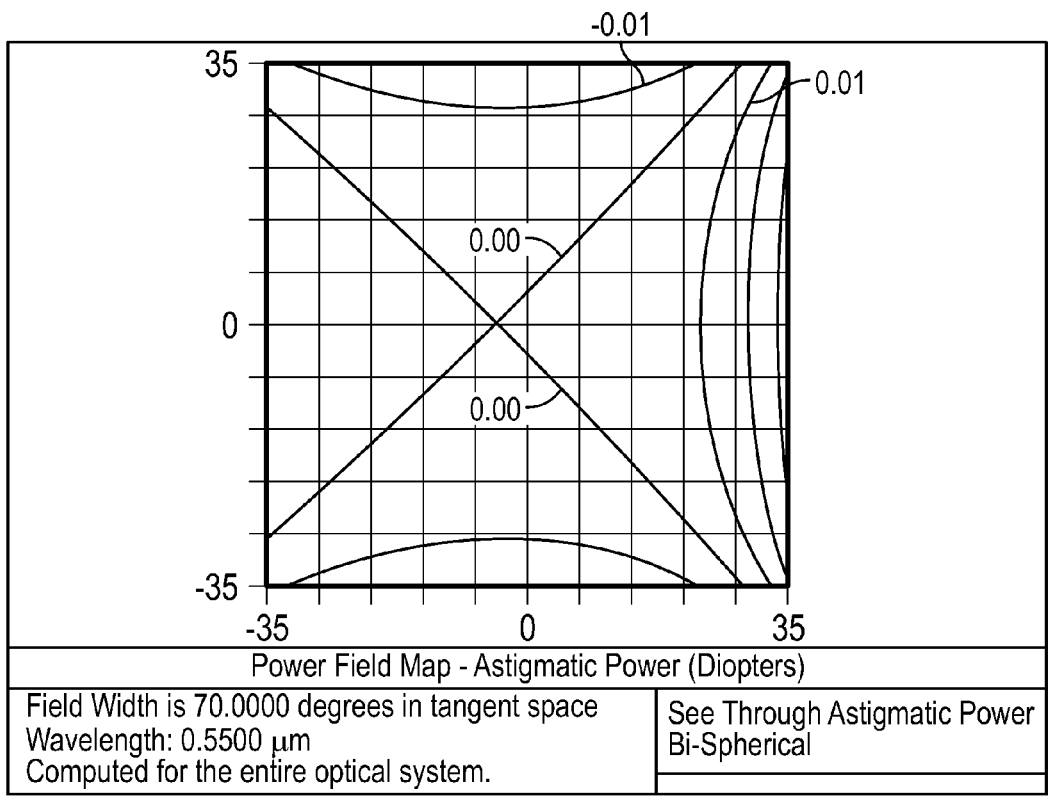
FIGS. 8A-F collectively illustrated performance graphs for the embodiment of FIG. 3.
Figure 8B:
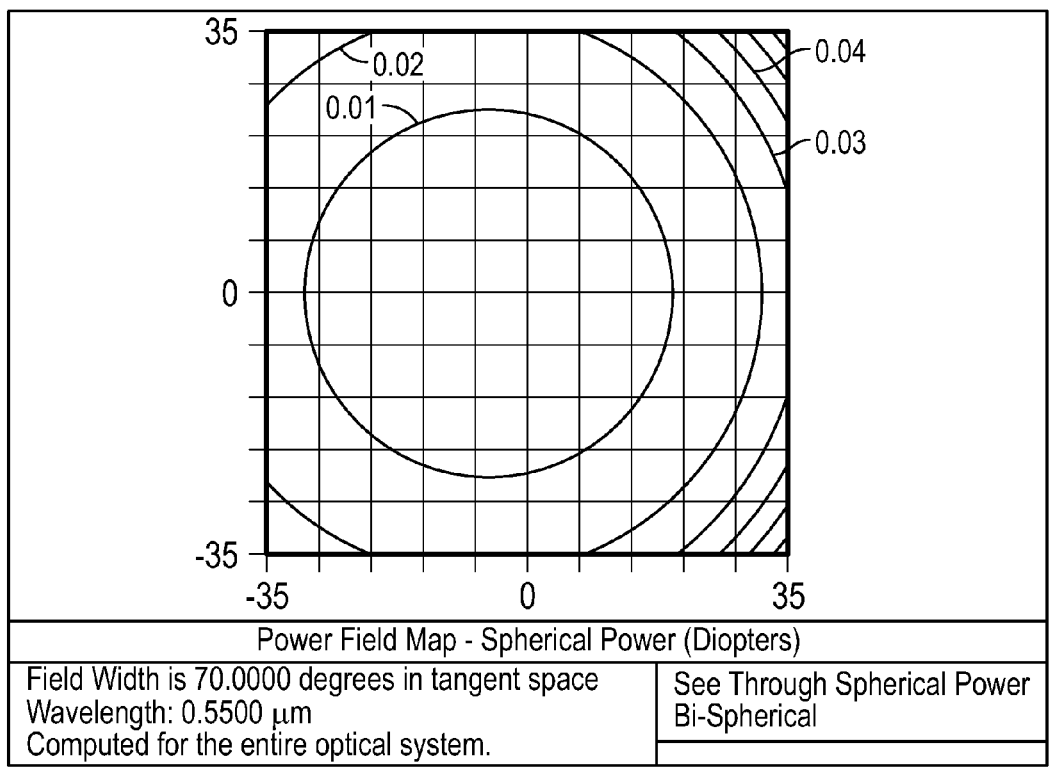
Figure 8C:
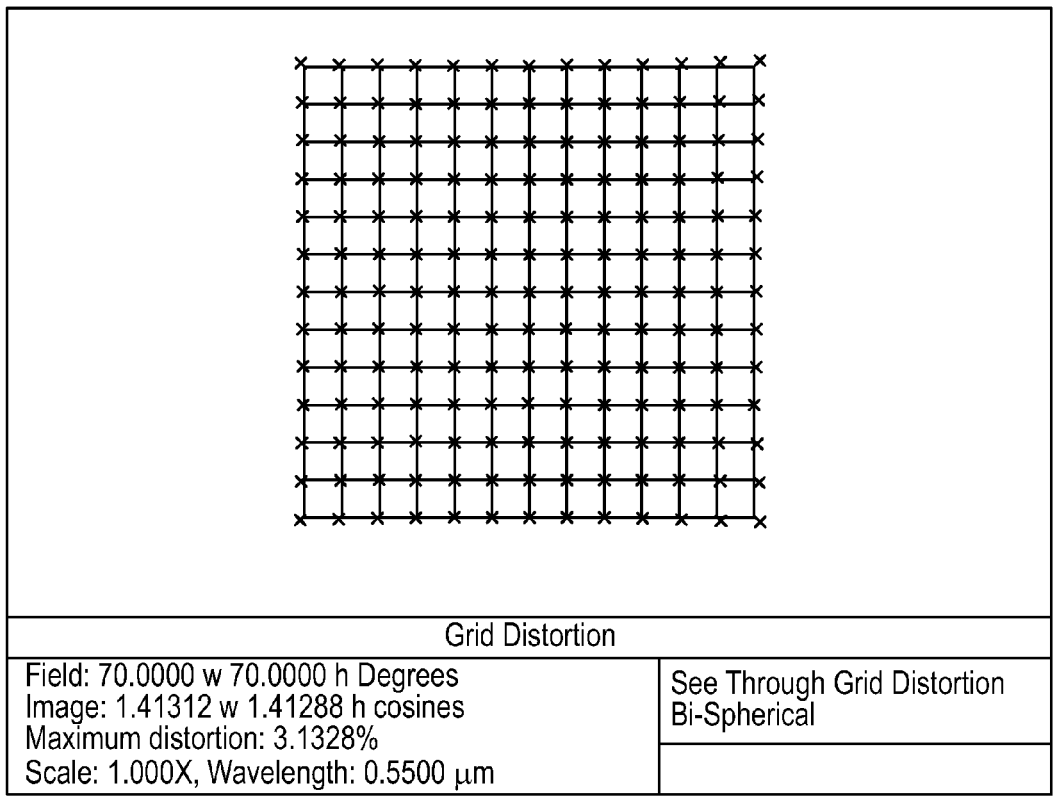
Figure 8D:
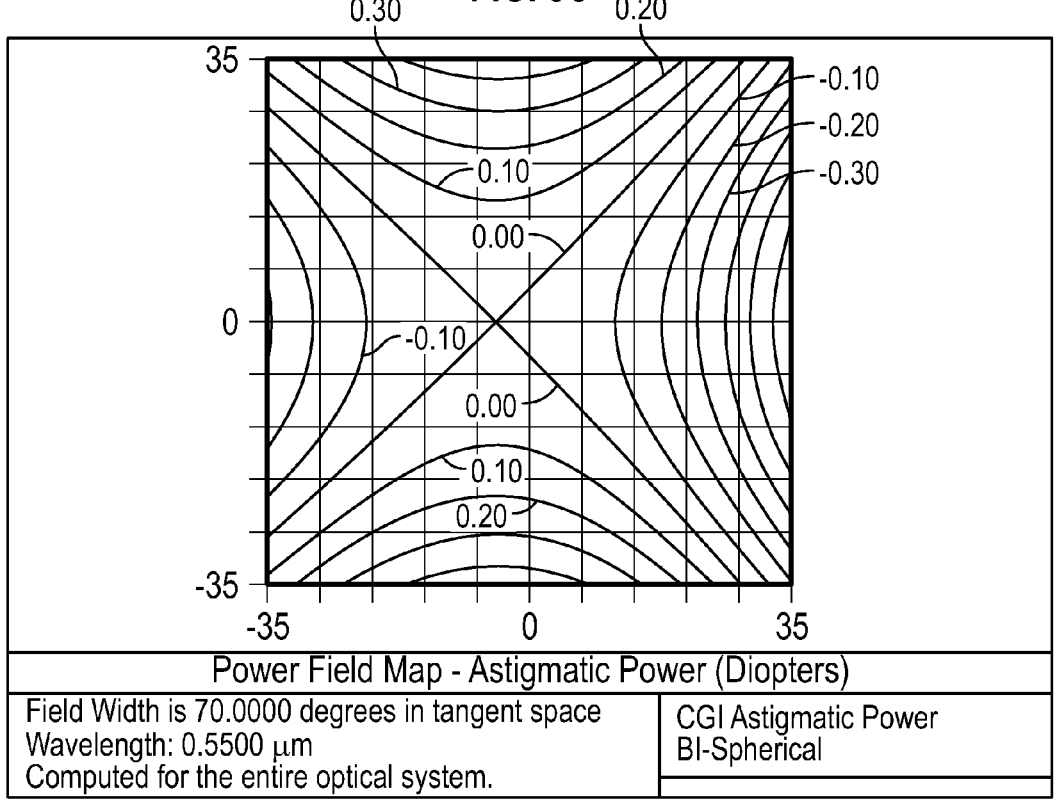
Figure 8E:
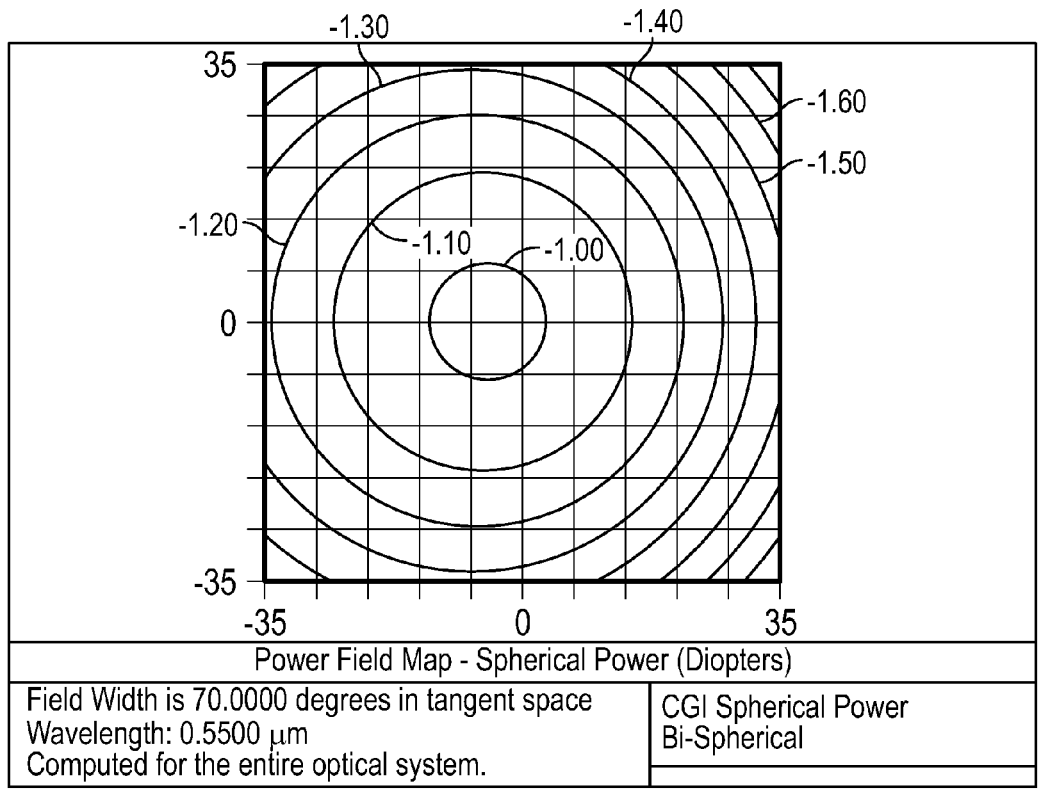
Figure 8F:
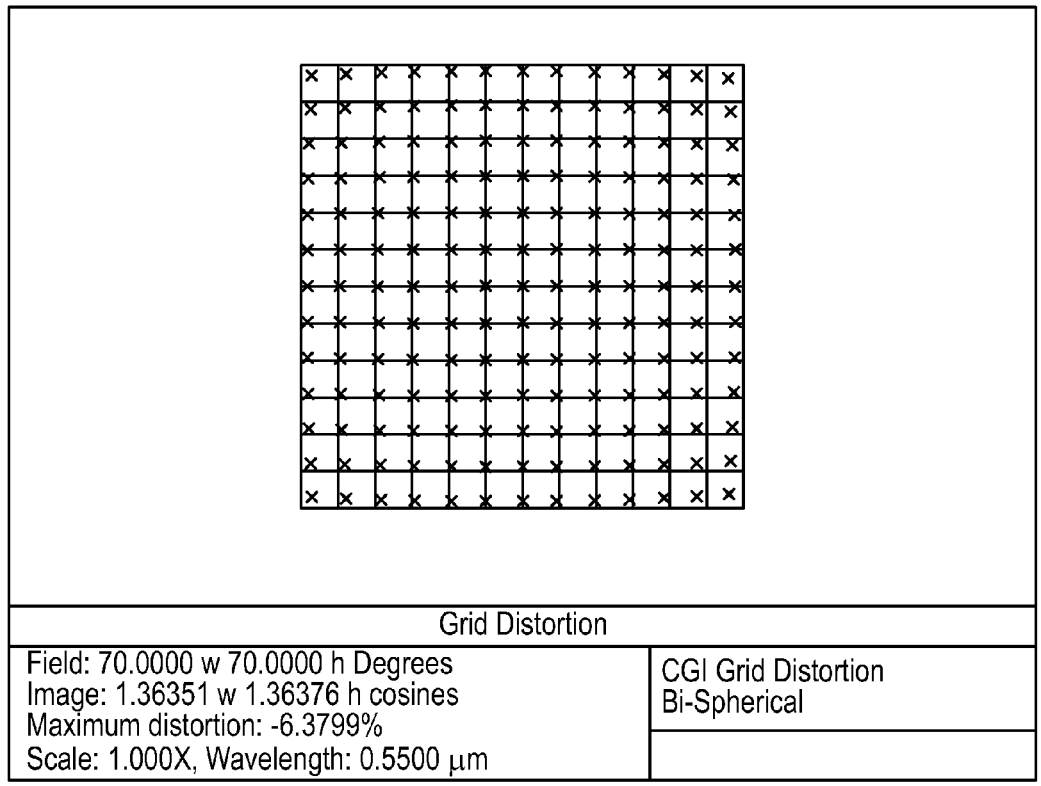
Figure 9A:
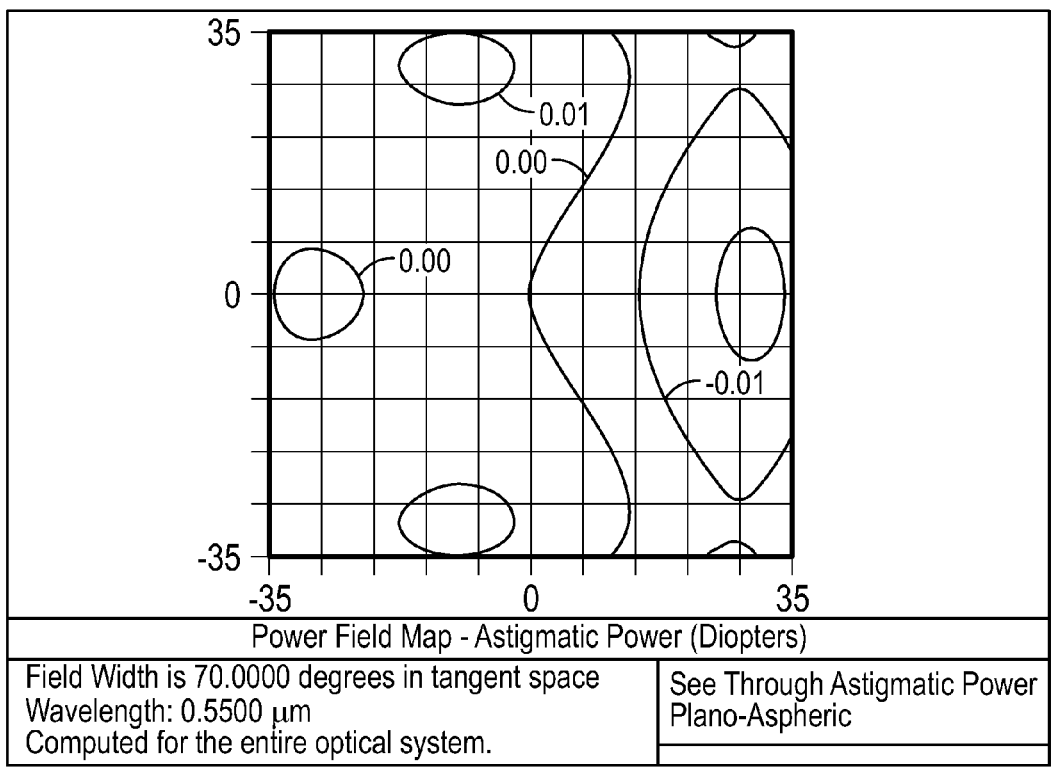
FIGS. 9A-F collectively illustrated performance graphs for the embodiment of FIG. 4.
Figure 9B:
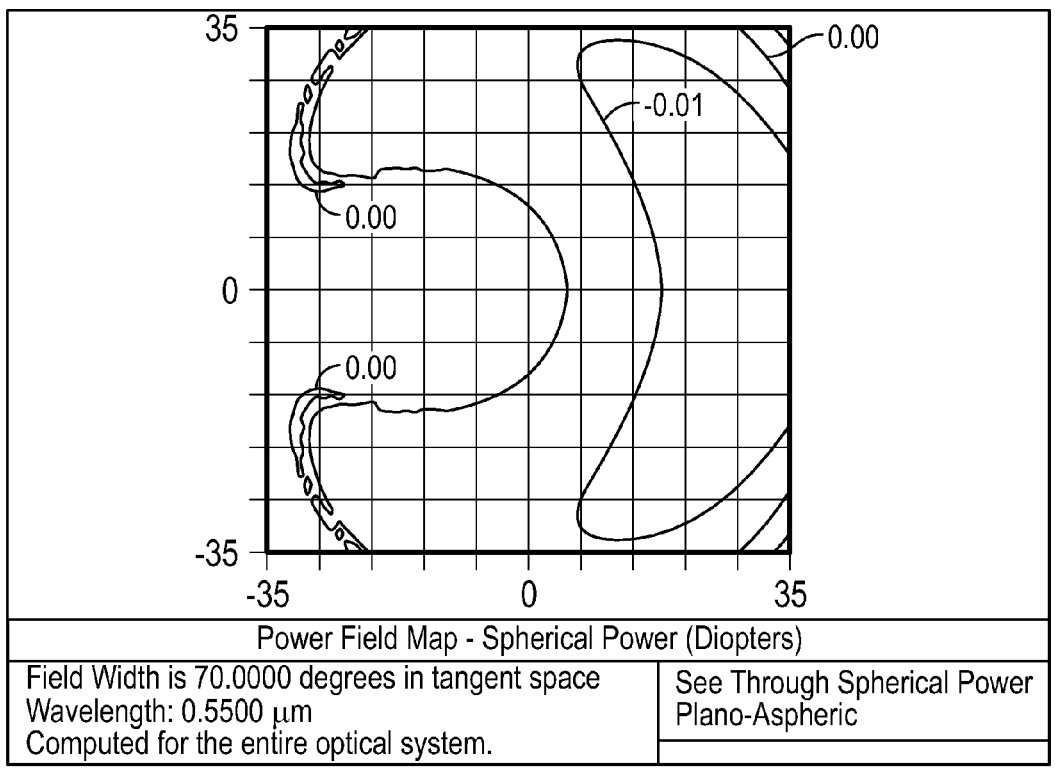
Figure 9C:
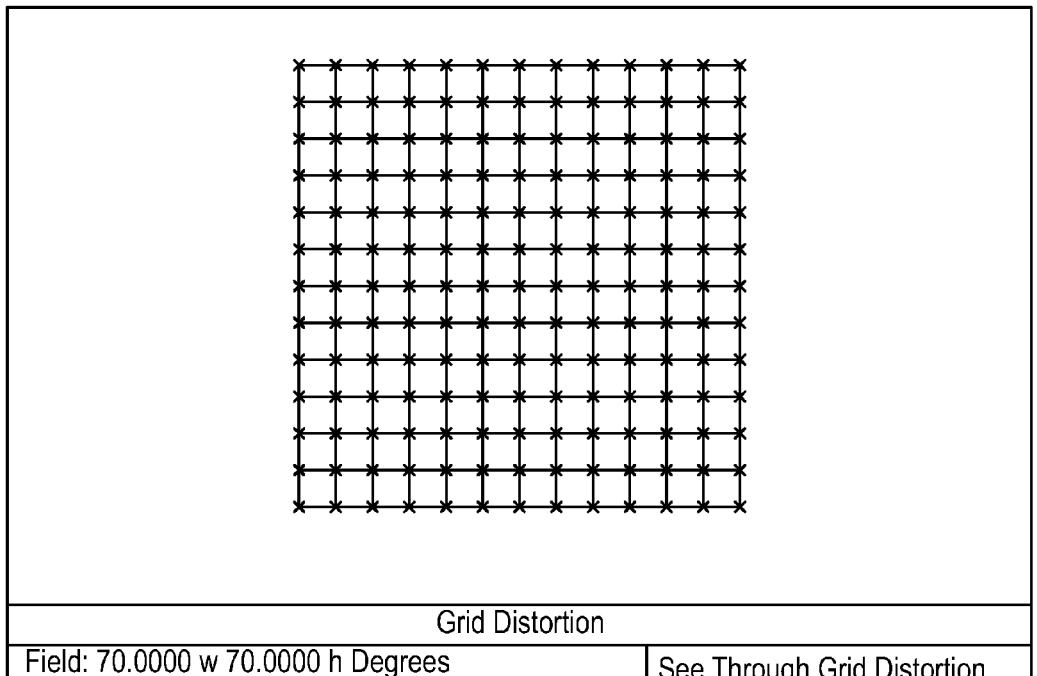
Figure 9D:
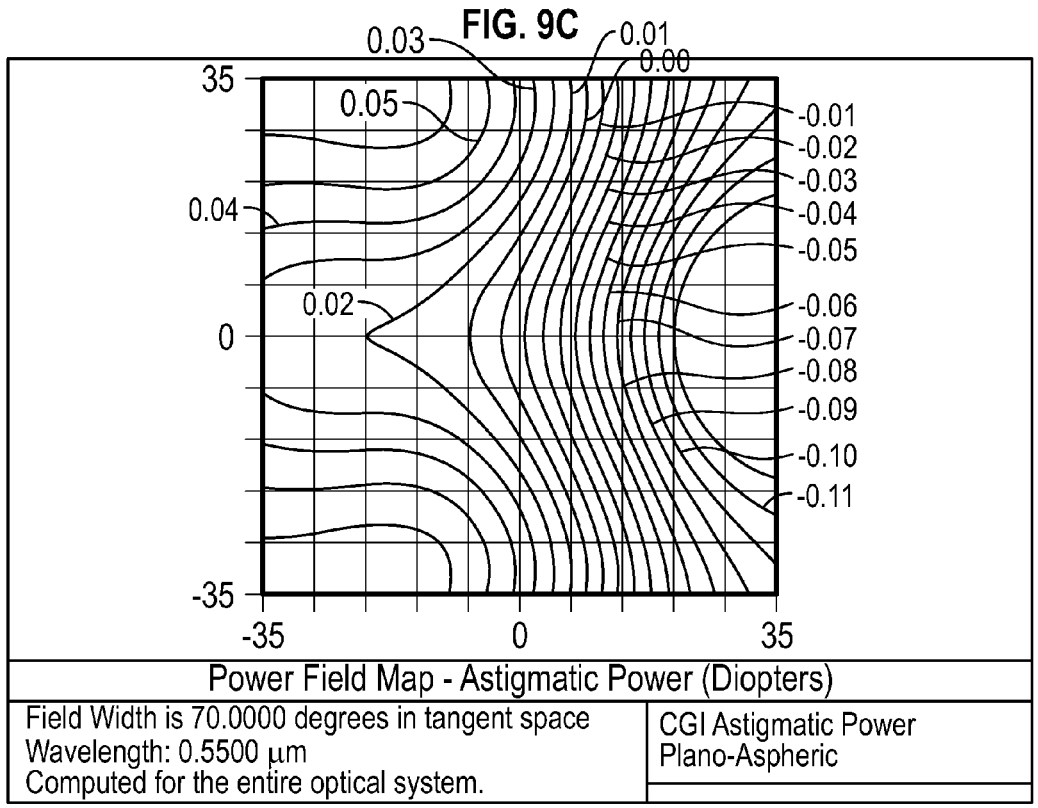
Figure 9E:
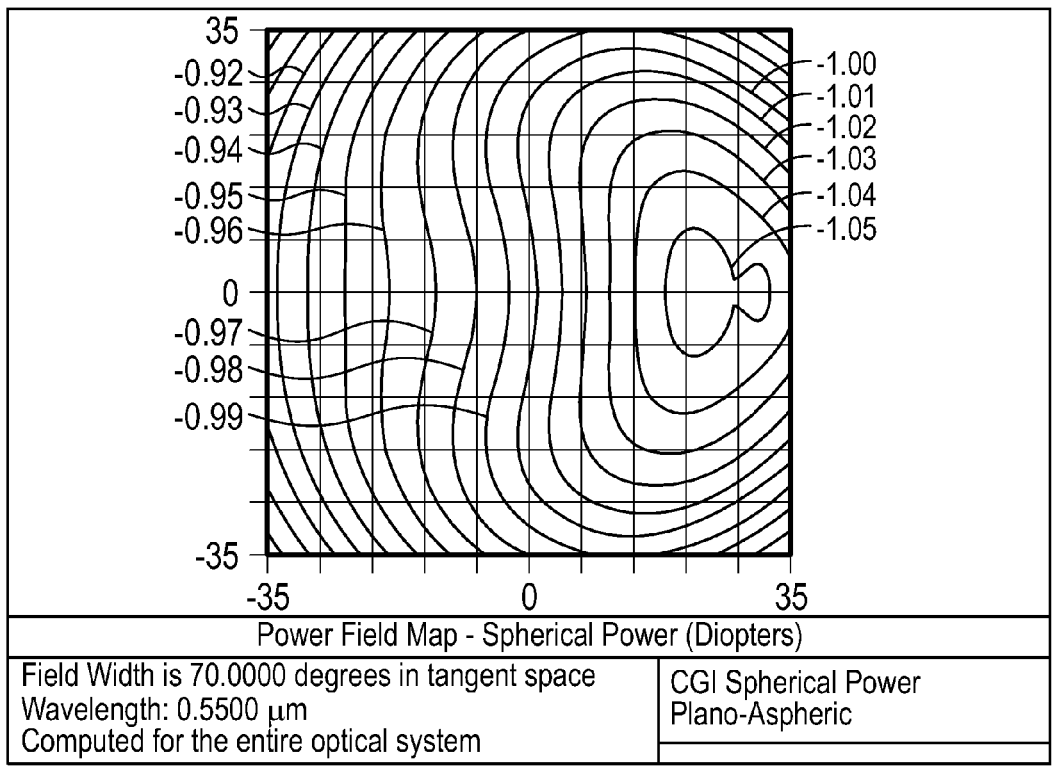
Figure 9F:
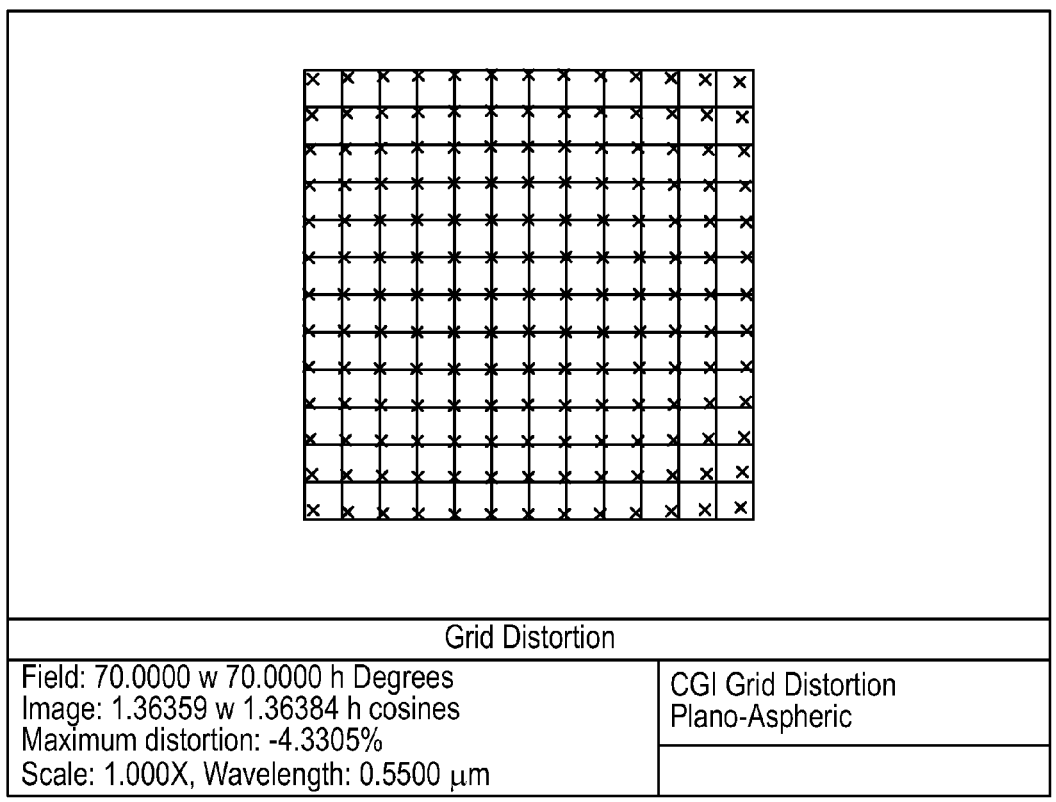

Referring now to FIG. 6, one embodiment of the present technology comprises a helmet-mounted sub system 600. In this arrangement there are two optical devices 602 and 604, one for each eye. Optical devices 602 and 604 are typically arranged such that a plane of each lens (optical devices here) is rotated slightly about a reference axis A. The reference axis A is orthogonal to the central viewing axis $V_A$.

This helps to wrap the optical sub system 600 around the natural shape of the head and the parameter governing this is called face-form angle θ. Typically a face-form angle θ of around five degrees is used. It is also usual to introduce a small rotation about the axis substantially aligned to a bridge 606 of the sub system 600. This rotation is called pantoscopic tilt angle φ and is usually in the range of approximately five to fifteen degrees, inclusive.

When considering practical systems it is important to take these geometrical considerations into account. Usually pantoscopic tilt angle φ is introduced along with a vertical shift in position such that it is as though the whole optical system were rotated about the center of rotation of the eye. When this is the case no special treatment is required in optical simulation as the relationship between the optical axis (central viewing axis) of the eye and the optical device remains unchanged. However, this is may not be true for face-form angle θ and consideration for this should be given.

Each of the optical devices 502, 504, 602 and 604 is coupled to its own image generator 510, 512, 610 and 612 respectively. The optical devices 502 and 504 can be mounted on the glasses frame 514 and the optical devices 602 and 604 can be mounted on the helmet sub-frame 620.

Additional Features

Various lens enhancements can be implemented in some embodiments. For example, the proximal lens closest to the eye could have surfaces with a shape that incorporates additional optical power such that the see-through image (background/real-world image) has a focal power equal to the prescription requirement of a wearer (including astigmatism). Non-zero power of the distal lens farthest from the eye would still provide for a shift of optical power between the real and CGIs.

In some embodiments an optical device can use diffractive optics for lenses, which result in very thin elements and an optical device with reduced overall size and weight.

In some embodiments, the optical device can include achromatic optics. For example, achromatic doublets or combined refractive/diffractive lenses could be used to reduce a wavelength dependence of optical performance of an example optical device due to variation of refractive index of optical materials with wavelength.

In some embodiments, optical devices can incorporate freeform optics. Beyond aspheric lenses it is possible implement lens designs which break circular symmetry. These non-circular symmetric lenses are advantageous, allowing for a more optimal balancing of optical properties over the actual field of view of lenses which for many applications is likely to be greater in the horizontal rather than vertical direction.

In some embodiments, lens elements can be provided in which all surfaces are aspherical or even freeform, as opposed to embodiments where only one of the proximal or distal lenses has aspherical or freeform surfaces.

In some embodiments, an optical device can be implemented with a variable opacity layer placed in between the distal lens farthest from the eye and the AIIE. This would allow for control of the relative intensity of the real-world image. Furthermore, the variable opacity layer (see layer 430 of FIG. 4) could be divided into pixels so that objects can be selectively occluded in the field-of-view.

It will be understood that a finite thickness of an optical device of the present technology means that some magnification will be generated. Furthermore some variation of this magnification with gaze angle can lead to distortion. Distortion is less of an issue for the CGI as it can be digitally compensated out by control of the image generator.

As mentioned above, some embodiments can be implemented in the context of prescription glasses. In one embodiment, spherical only correction can be achieved using plano-spherical lenses, with plano surfaces facing an AIIE (as with the embodiment of FIG. 4).

To provide refractive correction it is necessary that the combined refractive optical power of the distal lens and the proximal lens is equal to the required prescription. This ensures correct refractive correction for viewing a see-through image. Placement of an image inserted by the AIIE at an apparent distance nearer than infinity may then be accomplished by shifting the optical power of the prescription by an amount depending on the desired focal plane location for the CGI. This ensures that the eye has to perform the same focus adjustment to see the CGI sharply as it would for a real object located at the position of the desired focal plane. Since the change in focus power of the eye required to change focus from infinity to a finite distance, s, is given by the required shift in power for the CGI is given by, this $$\Delta P_v = -\Delta P_{eye} = -\frac{1}{s}.$$

If we ignore astigmatism for the time being and suppose that $P_r$ is the (spherical) refractive power required for a user's prescription then the refractive power required for the CGI (i.e. the power provided by lens 2 only) is given by $$P_v = P_r + \Delta P_v = P_r - \frac{1}{s}.$$

For example if a user has a spherical refractive error of −4 Diopters and one wishes to place a CGI at a distance of 0.5 m then the CGI power shift required is −2 Diopters and so one required lens 2 to provide −6 Diopters of correction and the combined system to provide −4 Diopters. These powers should be shifted appropriately if computed at the eye Center of Rotation rather than at the entrance pupil of the eye according to the equation $$P' = \frac{P_0}{1 - rP_0}$$

where $P_0$ is the specified power at the entrance pupil, P' is the corresponding target power at the location for simulation measurements (the eye centre-of-rotation in this case) and r is the distance from the entrance pupil to the analysis location.

The procedure for optimizing a system is similar to that without refractive error. The essential difference is that the target optical power for the computer generated system is now set by $P_v$, as described above and the target optical power for the full see-through image is no longer zero and is instead $P_r$.

If we ignore astigmatism then the lens forms described in the embodiments herein for the non-prescription systems are all valid for providing prescription correction. Of particular interest is the use of plano-aspherical lenses for distal and proximal lenses as this approach can yield a system with good optical performance and a compact form-factor.

The relative z-position of the front surface of the proximal lens, $z_{21}$, in polar coordinates (r,θ) measured from the lens origin is given by:

$$z_{21} = \frac{r^2}{R_3 + \sqrt{(R_3^2 - r^2)}}$$

The z-position of the back surface of the proximal lens, $z_{22}$ is given by:

$$z_{22} = \frac{r^2}{R_4\left(1 + \sqrt{1 - \frac{(1 + \kappa_2)r^2}{R_4^2}}\right)} + B_2 r^2 + B_4 r^4 + B_6 r^6$$

Where $R_3$, $R_4$ are the radii of curvature of the lens surfaces, and $\kappa_2$, $B_2$, $B_4$, $B_6$ and $B_6$ are additional parameters inducing aspheric variation of the lens surface shape. Setting $R_3 = \infty$ ensures that the back surface is plano. The values of $\kappa_2$, $B_2$, $B_4$, $B_6$ are set via optimization as described above, except targeting a focusing power derived from the target refractive prescription for the system and desired focal plane location for the CGI.

Similarly the expression for the front surface of distal lens, $z_{11}$ is given by:

$$z_{11} = \frac{r^2}{R_1\left(1 + \sqrt{1 - \frac{(1 + \kappa_1)r^2}{R_1^2}}\right)} + A_2 r^2 + A_4 r^4 + A_6 r^6$$

And the back surface, $z_{12}$, is given by:

$$z_{12} = \frac{r^2}{R_2 + \sqrt{(R_2^2 - r^2)}}$$

Where $R_2$, $R_1$ are the radii of curvature of the lens surfaces, and $\kappa_2$, $A_2$, A, $A_6$ are additional parameters inducing aspheric variation of the lens surface shape. The values of $\kappa_1$, $A_2$, $A_4$, $A_6$ are then set via optimization as described previously, except targeting the refractive prescription for the spherical power of the see-through optical system.

The range of combinations of refractive power and target CGI focal plane location is very large, but a few exemplary systems are presented in the table below. For all of these a computer generated image focal plane distance of one meter has been chosen. For these systems the lenses are assumed to be made from polycarbonate and the AIIE from quartz glass (as for all the other systems).

TABLE 4

| | | | | | |
|---|---|---|---|---|---|
| CGI focal plane (m) | 1 | 1 | 1 | 1 | 1 |
| Spherical Prescription (D) (also see-through focus power) | 0 | −1 | −3 | −5 | +2 |
| CGI focus power at eye entrance pupil (D) | −1 | −2 | −4 | −6 | +1 |
| CGI focus power at eye COR (D) | −0.988 | −1.953 | −3.817 | −5.597 | +1.012 |
| See-through image focus power at eye COR (D) | 0 | −0.988 | −2.896 | −4.717 | +2.049 |
| Distal Lens front surface radius of curvature, $R_1$ (mm) | 595.999 | 609.101 | 648.916 | 680.212 | 557.490 |
| Distal Lens back surface radius of curvature, $R_2$ (mm) | ∞ | ∞ | ∞ | ∞ | ∞ |
| Distal Lens center thickness, $t_1$ (mm) | 3 | 3 | 3 | 3 | 3 |
| Distal Lens, conic constant, k | 0 | 0 | 0 | 0 | 0 |
| Distal Lens asphere coefficient, $A_2$ | 0 | 0 | 0 | 0 | 0 |
| Distal Lens asphere coefficient, $A_4$ | −1.401E−7 | −1.108E−7 | −1.322E−7 | −1.582E−7 | −1.192E−7 |
| Distal Lens asphere coefficient, $A_6$ | 2.328E−11 | 3.107E−12 | 3.033E−11 | 6.454E−11 | 8.687E−12 |
| Gap 1, Lens 1-AIIE (mm) | 0.25 | 0.25 | 0.25 | 0.25 | 0.25 |
| AIIE thickness, T (mm) | 2 | 2 | 2 | 2 | 2 |
| Gap 2, AIIE-Lens 2 (mm) | 0.25 | 0.25 | 0.25 | 0.25 | 0.25 |
| Proximal Lens front surface radius of curvature, $R_3$ (mm) | ∞ | ∞ | ∞ | ∞ | ∞ |
| Proximal Lens back surface radius of curvature, $R_4$ (mm) | 595.026 | 301.063 | 151.011 | 103.335 | −573.179 |
| Proximal Lens center thickness, $t_2$ (mm) | 1 | 1 | 1 | 1 | 3 |
| Proximal Lens conic constant, k | 0 | 0 | 0 | 0 | 0 |
| Proximal Lens asphere coefficient, $B_2$ | 0 | 0 | 0 | 0 | 0 |
| Proximal Lens asphere coefficient, $B_4$ | −1.793E−7 | −3.134e−7 | −6.741E−7 | −8.319E−7 | 2.205E−7 |
| Proximal Lens asphere coefficient, $B_6$ | 3.649E−11 | 4.738E−11 | 1.706E−10 | 1.932E−10 | −4.83E−11 |

In the systems described above the front lens elements, the distal lens is optimized separately for each system. However, to a reasonable approximation the power required for the front element is governed by the CGI focal plane shift. In the limit of an ideal, thin lens system, where thickness propagation effects in the optical system are neglected then the focusing power of the distal lens is given by $$P_1 = -\Delta P_v = \frac{1}{s}.$$

Thus in one set of embodiments (not shown) a standard design for the distal may be used with a range of different designs for proximal lens thus enabling a system to be changed to suit different prescriptions simply by swapping out the distal lens. In some embodiments, the parameters for distal lens in such a system are set by optimizing for a single prescription, or balancing the optimized performance across a range of configurations, each tailored for a different prescription. In one embodiment, such a balance is weighted to place a greater emphasis on the more likely prescriptions, optionally including zero to account for the original case where no correction is required, only shift of the CGI.

In another embodiment, prescription glasses with spherocylindrical correction using extended bionic/freeform lens surfaces with plano surfaces facing a AIIE are provided.

Astigmatism in an optical system is one where the focusing power varies depending on the plane in which the analysis is being performed. An astigmatic prescription is described using three parameters, typically the convention is to describe the focusing power in one plane (this is called the spherical power part of the prescription), the shift in focusing power in a plane orthogonal to the first plane (called the cylinder part of the prescription) and an angle which describes the orientation of the first plane with respect to a global coordinate system (called the axis part of the prescription).

An alternative and equivalent approach for describing astigmatism is to specify focusing power in two orthogonal planes and then an angle which orients these planes within a global coordinate system. Essentially one plane has a power equal to the spherical power part of a given prescription and the other plane has a power equal to the sum of the spherical and cylinder power parts of the given prescription. Within a given plane the relationship between overall focusing power and CGI focus shift are the same as those for sphere-only prescriptions as described above. For example, suppose we align a local coordinate system (via rotation by the axis angle of the astigmatic prescription) so that the two orthogonal focusing planes describe focusing in either the Y-direction or X-direction and denote the required refractive powers as $P_r^Y$ and $P_r^X$ accordingly. If we require a CGI focal shift of $\Delta P_v = -1/s$ then the CGI focusing powers are given by $$P_v^Y = P_r^Y - \frac{1}{s} \text{ and } P_v^X = P_r^X - \frac{1}{s}$$

in the Y and X-directions respectively.

Thus whereas for all systems until now optimization has proceeded by targeting a prescribed spherical focusing power and zero astigmatic (or cylinder) power over a field-of-view we instead now target a Y-direction focusing power and an X-direction focusing power. Here we also note that we can account for the axis of an astigmatic prescription via a rotation operation on the lens system (e.g. achieved via a coordinate break feature in ray-tracing packages such as Zemax).

The sphere/cylinder/axis convention originates from the principal that one can create an astigmatic focusing system by combining a spherical lens with a cylindrical lens the axis of which may be rotated to then control the orientation of the two orthogonal focusing planes. To accomplish such spherocylindrical focusing in a single element it is necessary in general to move away from axisymmetric optics.

In some embodiments, one of the surfaces of each lens is described using a non-axisymmetric freeform surface function. Described below is one such embodiment. In this system the relative z-position of the front surface of the proximate lens, $z_{21}$, in polar coordinates (r,θ) measured from the lens origin is given by:

$$z_{21} = \frac{r^2}{R_3 + \sqrt{(R_3^2 - r^2)}}$$

The relative z-position of the back surface of the proximate lens, $z_{22}$, in polar coordinates (r,θ) measured from the lens origin is given by:

$$z_{22} = \frac{\frac{x^2}{R_4^X} + \frac{y^2}{R_4^Y}}{1 + \sqrt{1 - (1+k_2^X)\left(\frac{x}{R_4^X}\right)^2 - (1+k_2^Y)\left(\frac{y}{R_4^Y}\right)^2}} + \sum_{i=1}^{15} B_i Z_i\left(\frac{r}{R_N}, \theta\right)$$

Where $R_N$ is a normalization radius parameter (set to 30 mm) and the Cartesian coordinates (x,y) are given by x=r cos θ and y=r sin θ. $R_4^X$ and are parameters describing radius of curvature of the surface in the X and Y directions respectively. $k_2^X$ and $k_2^Y$ are conic-constant parameters. Bare coefficients governing the contribution made by terms in the series of functions denoted by $Z_i(\rho,\phi)$ which are the Zernike standard polynormials, as fined in R. Noll, "Zernike polynomials and atmospheric turbulence", J. Opt. Soc. Am., Vol. 66, p 207 (1976). The first 15 functions in this series are given in Table 5 below:

TABLE 5

| Term, i | Zernike polynomial $Z_i(\rho, \phi)$ |
|---|---|
| 1 | 1 |
| 2 | $\sqrt{4}\rho \cos \phi$ |
| 3 | $\sqrt{4}\rho \sin \phi$ |
| 4 | $\sqrt{3}(2\rho^2 - 1)$ |
| 5 | $\sqrt{6}(\rho^2 \sin 2\phi)$ |
| 6 | $\sqrt{6}(\rho^2 \cos 2\phi)$ |
| 7 | $\sqrt{8}(3\rho^3 - 2\rho) \sin \phi$ |
| 8 | $\sqrt{8}(3\rho^3 - 2\rho) \cos \phi$ |
| 9 | $\sqrt{8}\rho^3 \sin 3\phi$ |
| 10 | $\sqrt{8}\rho^3 \cos 3\phi$ |
| 11 | $\sqrt{5}(6\rho^4 - 6\rho^2 + 1)$ |
| 12 | $\sqrt{10}(4\rho^4 - 3\rho^2) \cos 2\phi$ |
| 13 | $\sqrt{10}(4\rho^4 - 3\rho^2) \sin 2\phi$ |
| 14 | $\sqrt{10}\rho^4 \cos 4\phi$ |
| 15 | $\sqrt{10}\rho^4 \sin 4\phi$ |

For the systems considered here it is only necessary to include terms with even powers of the radial coordinate to obtain good performance, corresponding to terms i=4, 5, 6, 11, 12, 13, 14, 15, 16. In fact, if one neglects face-form angle then symmetry of the system requires that terms featuring odd-powers in the radial coordinate are zero. However, all terms can be used as can higher order terms if necessary.

Setting $R_3 = \infty$ ensures that the back surface is plano. The values of $R_4^X$, $R_4^Y$, $k_2^X$, $k_2^Y$, $B_4$, $B_5$, $B_6$, $B_{13}$, $B_{14}$ and $B_{15}$ are set via optimization as described above, except targeting the X and Y focusing powers derived from the required prescription and CGI focal plane location.

Similarly the expression for the front surface of the distal lens, $z_{11}$ is given by:

$$z_{11} = \frac{\frac{x^2}{R_1^X} + \frac{y^2}{R_1^Y}}{1 + \sqrt{1 - (1+k_1^X)\left(\frac{x}{R_1^X}\right)^2 - (1+k_1^Y)\left(\frac{y}{R_1^Y}\right)^2}} + \sum_{i=1}^{15} A_i Z_i\left(\frac{r}{R_N}, \theta\right)$$

And the back surface, $z_{12}$, is given by:

$$z_{12} = \frac{r^2}{R_2 + \sqrt{(R_2^2 - r^2)}}$$

Where $R_2$ is the radius of curvature of the back lens surface (set to ∞ here so that the surface is planar). $R_1^X$ and $R_1^Y$ are parameters describing radius of curvature of the front surface of lens 1 in the X and Y directions respectively. $k_1^X$ and $k_1^Y$ are conic-constant parameters. $A_i$ are coefficients governing the contribution made by terms in the series of functions denoted by $Z_i(\rho,\phi)$. The values of $R_1^X$, $R_1^Y$, $k_1^X$, $A_4$, $A_5$, $A_6$, $A_{11}$, $A_{12}$, $A_{13}$, $A_{14}$ and $A_{15}$ are set via optimization as described in step 3 of the original description except targeting the X and Y focusing powers for the required prescription.

The number of possible systems is very large, however a range of exemplary astigmatic systems are described in the table below. As for the other systems the assumed material for the distal and proximal lenses is polycarbonate and the AIIE is assumed to be made from quartz glass. As for the spherical-only case it is also possible to substitute the distal lens for a standard lens determined by the desired CGI focal plan location such that different prescriptions can then be realized by changing proximal lens only.

It is worth noting that no axis angle is specified below, this is because it is assumed that correct orientation of the astigmatic lens system may be achieved simply by rotation—as such although the orientation of the X,Y directions of our lens system might change in a global coordinate system the internal description of the system within its local coordinate system will depend only on the X and Y focusing powers, not the axis. It is also worth noting that face-form angle will potentially have a small effect for different axis angles, but this can be accounted for by rotating the axis about which the face-form transformation is applied to the optical system.

A few exemplary systems are presented in the table below. For all of these a computer generated image focal plane distance of 1 m has been chosen. For these systems the lenses are assumed to be made from polycarbonate and the AIIE from quartz glass (as for all the other systems).

TABLE 6

According to some embodiments, for positive prescriptions the curvature of the back surface of the proximal lens bends away from the eye, which is less favorably optically. A variation of the system above is to swap the surface descriptions for the proximal lens such that the relative z-position of the front surface of the proximal lens, $z_{21}$, in polar coordinates (r, θ) measured from the lens origin is given by:

| | | | | |
|---|---|---|---|---|
| CGI focal plane (m) | 1 | 1 | 1 | 1 |
| CGI focal shift (D) | −1 | −1 | −1 | −1 |
| Y-direction optical power, see-through prescription (D) | −1 | −3 | −5 | 2 |
| As measured at eye COR (D) | −0.988 | −2.896 | −4.717 | 2.049 |
| X-direction optical power, see through prescription(D) | −1.5 | −4 | −7 | 1.5 |
| As measured at eye COR (D) | −1.473 | −3.817 | −6.458 | 1.527 |
| Y-direction optical power for CGI (D) | −2 | −4 | −6 | 1 |
| As measured at eye COR (D) | −1.953 | −3.817 | −5.597 | 1.012 |
| X-direction optical power for CGI (D) | −2.5 | −5 | −8 | 0.5 |
| As measured at eye COR (D) | −2.427 | −4.717 | −7.299 | 0.503 |
| Distal Lens front surface Y-direction radius of curvature, $R_1^Y$ (mm) | 611.836 | 662.072 | 685.535 | 554.929 |
| Distal Lens front surface X-direction radius of curvature, $R_1^X$ (mm) | 615.931 | 680.606 | 713.646 | 560.150 |
| Distal Lens back surface radius of curvature, $R_2$ (mm) | ∞ | ∞ | ∞ | ∞ |
| Distal Lens center thickness, $t_1$ (mm) | 3 | 3 | 3 | 3 |
| Distal Lens Y-direction conic constant, $k_1^Y$ | −262.415 | −250.946 | −316.437 | −226.675 |
| Distal Lens X-direction conic constant, $k_1^X$ | −275.980 | −274.462 | −347.960 | −235.899 |
| Distal Lens Zernike coefficient $A_4$ | −2.50E−4 | 1.909E−3 | 1.852E−4 | 0 |
| Distal Lens Zernike coefficient $A_5$ | 3.0E−2 | 2.695E−3 | 6.039E−5 | 0 |
| Distal Lens Zernike coefficient $A_6$ | 3.716E−4 | 1.555E−3 | 5.071E−5 | 0 |
| Distal Lens Zernike coefficient $A_{11}$ | 5.447E−4 | −4.219E−4 | −2.587E−4 | 0 |
| Distal Lens Zernike coefficient $A_{12}$ | 1.146E−4 | 7.178E−5 | −1.704E−6 | 0 |
| Distal Lens Zernike coefficient $A_{13}$ | 2.422E−4 | 3.498E−5 | −6.750E−7 | 0 |
| Distal Lens Zernike coefficient $A_{14}$ | −2.577E−3 | −1.662E−3 | 8.436E−5 | 0 |
| Distal Lens Zernike coefficient $A_{15}$ | 3.351E−5 | 7.842E−6 | 2.775E−6 | 0 |
| Gap 1, Distal Lens-AIIE (mm) | 0.25 | 0.25 | 0.25 | 0.25 |
| AIIE thickness, T (mm) | 2 | 2 | 2 | 2 |
| Gap 2, AIIE-Proximal Lens (mm) | 0.25 | 0.25 | 0.25 | 0.25 |
| Proximal Lens front surface radius of curvature, $R_3$ (mm) | ∞ | ∞ | ∞ | ∞ |
| Proximal Lens back surface Y-direction radius of curvature, $R_4^Y$ (mm) | 296.325 | 151.990 | 104.396 | −583.926 |
| Proximal Lens back surface X-direction radius of curvature, $R_4^X$ (mm) | 241.517 | 124.177 | 80.433 | −1134.408 |

TABLE 6-continued

According to some embodiments, for positive prescriptions the curvature of the back surface of the proximal lens bends away from the eye, which is less favorably optically. A variation of the system above is to swap the surface descriptions for the proximal lens such that the relative z-position of the front surface of the proximal lens, $z_{21}$, in polar coordinates (r, θ) measured from the lens origin is given by:

| | | | | |
|---|---|---|---|---|
| Proximal Lens center thickness, $t_2$ (mm) | 1 | 1 | 1 | 3 |
| Proximal Lens Y-direction conic constant, $k_2^Y$ | −77.188 | −16.358 | −5.232 | −405.799 |
| Proximal Lens X-direction conic constant, $k_2^X$ | −49.213 | −9.816 | −2.569 | −1461.170 |
| Proximal Lens Zernike coefficient $B_4$ | 3.794E−4 | 3.949E−3 | −8.276E−4 | 0 |
| Proximal Lens Zernike coefficient $B_5$ | 8.028E−3 | 4.550E−4 | 4.501E−4 | 0 |
| Proximal Lens Zernike coefficient $B_6$ | 1.898E−3 | 3.240E−3 | 5.015E−3 | 0 |
| Proximal Lens Zernike coefficient $B_{11}$ | 2.190E−3 | 4.647E−3 | 3.478e−3 | 0 |
| Proximal Lens Zernike coefficient $B_{12}$ | 1.649E−4 | 3.502E−4 | 1.554E−3 | 0 |
| Proximal Lens Zernike coefficient $B_{13}$ | 1.385E−4 | 2.308E−5 | 2.460E−5 | 0 |
| Proximal Lens Zernike coefficient $B_{14}$ | −9.468E−3 | −1.90E−2 | −2.80E−2 | 0 |
| Proximal Lens Zernike coefficient $B_{15}$ | 3.430E−5 | 7.951E−6 | 9.443E−6 | 0 |

$$z_{21} = \frac{\frac{x^2}{R_3^X} + \frac{y^2}{R_3^Y}}{1 + \sqrt{1 - (1+k_2^X)\left(\frac{x}{R_3^X}\right)^2 - (1+k_2^Y)\left(\frac{y}{R_3^Y}\right)^2}} + \sum_{i=1}^{15} B_i Z_i\left(\frac{r}{R_N}, \theta\right),$$

and the relative z-position of the back surface of lens 2, $z_{22}$, in polar coordinates (r,θ) measured from the lens origin is given by:

$$z_{22} = \frac{r^2}{R_4 + \sqrt{(R_4^2 - r^2)}}.$$

Two example embodiments are described in Table 7.

| | | |
|---|---|---|
| CGI focal plane (m) | 1 | 1 |
| CGI focal shift (D) | −1 | −1 |
| Y-direction optical power, see-through prescription (D) | 2 | 4 |
| As measured at eye COR (D) | 2.049 | 4.202 |
| X-direction optical power, see through prescription(D) | 1.5 | 3 |
| As measured at eye COR (D) | 1.527 | 3.112 |
| Y-direction optical power for CGI (D) | 1 | 3 |
| As measured at eye COR (D) | 1.012 | 3.112 |
| X-direction optical power for CGI (D) | 0.5 | 2 |
| As measured at eye COR (D) | 0.503 | 2.049 |
| Distal Lens front surface Y-direction radius of curvature, $R_1^Y$ (mm) | 557.912 | 535.262 |
| Distal Lens front surface X-direction radius of curvature, $R_1^X$ (mm) | 564.127 | 521.581 |
| Distal Lens back surface radius of curvature, $R_2$ (mm) | ∞ | ∞ |
| Distal Lens center thickness, $t_1$ (mm) | 3 | 3 |
| Distal Lens Y-direction conic constant, $k_1^Y$ | −211.817 | −168.172 |
| Distal Lens X-direction conic constant, $k_1^X$ | −220.165 | −184.765 |
| Distal Lens Zernike coefficient $A_4$ | 0 | −1.00E−2 |
| Distal Lens Zernike coefficient $A_5$ | 0 | −9.30E−2 |
| Distal Lens Zernike coefficient $A_6$ | 0 | −5.563E−3 |
| Distal Lens Zernike coefficient $A_{11}$ | 0 | −5.178E−4 |
| Distal Lens Zernike coefficient $A_{12}$ | 0 | 5.009E−4 |
| Distal Lens Zernike coefficient $A_{13}$ | 0 | 2.297E−4 |
| Distal Lens Zernike coefficient $A_{14}$ | 0 | −1.437E−3 |
| Distal Lens Zernike coefficient $A_{15}$ | 0 | 3.050E−4 |
| Gap 1, Distal Lens-AIIE (mm) | 0.25 | 0.25 |
| AIIE thickness, T (mm) | 2 | 2 |
| Gap 2, AIIE-Proximal Lens (mm) | 0.25 | 0.25 |
| Proximal Lens back surface radius of curvature, $R_3$ (mm) | ∞ | ∞ |
| Proximal Lens front surface Y-direction radius of curvature, $R_3^Y$ (mm) | 582.555 | 192.776 |
| Proximal Lens front surface X-direction radius of curvature, $R_3^X$ (mm) | 1134.859 | 284.420 |
| Proximal Lens center thickness, $t_2$ (mm) | 3 | 3 |
| Proximal Lens Y-direction conic constant, $k_2^Y$ | −311.866 | −25.213 |
| Proximal Lens X-direction conic constant, $k_2^X$ | −1168.584 | −56.078 |
| Proximal Lens Zernike coefficient $B_4$ | 1.209E−5 | −1.935E−3 |
| Proximal Lens Zernike coefficient $B_5$ | 1.50E−2 | 9.284E−4 |
| Proximal Lens Zernike coefficient $B_6$ | 2.976E−4 | −5.774E−4 |
| Proximal Lens Zernike coefficient $B_{11}$ | 2.236E−4 | 2.018E−4 |
| Proximal Lens Zernike coefficient $B_{12}$ | −1.853E−4 | −1.182E−4 |
| Proximal Lens Zernike coefficient $B_{13}$ | 6.901E−5 | 6.956E−6 |
| Proximal Lens Zernike coefficient $B_{14}$ | −1.096E−3 | −8.412E−3 |
| Proximal Lens Zernike coefficient $B_{15}$ | −2.637E−5 | −2.50E−6 |

Figure 12:
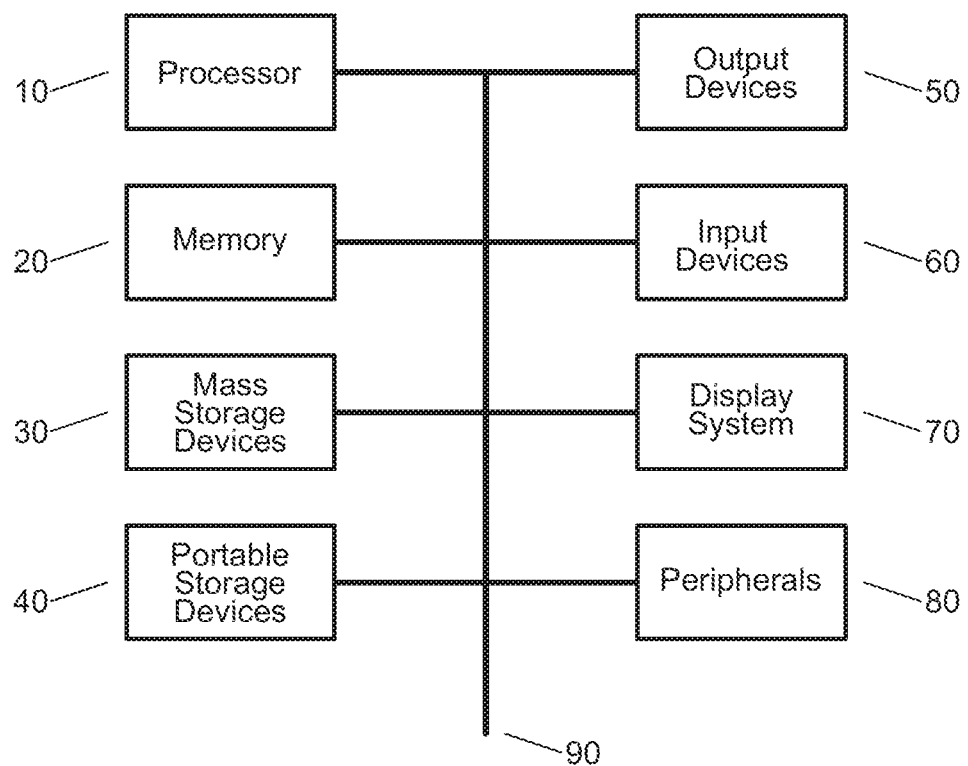
FIG. 12 is a schematic diagram of a computing device that can be utilized to implement aspects of the present technology according to one embodiment.

FIG. 12 illustrates an exemplary computing device 1 that may be used to implement an embodiment of the present systems and methods. The system 1 of FIG. 2 may be implemented in the contexts of the likes of the image processing device described herein. The computing device 1 of FIG. 12 includes a processor 10 and main memory 20. Main memory 20 stores, in part, instructions and data for execution by processor 10. Main memory 20 may store the executable code when in operation. The system 1 of FIG. 12 further includes a mass storage device 30, portable storage device 40, output devices 50, user input devices 60, a display system 70, and peripherals 80.

The components shown in FIG. 12 are depicted as being connected via a single bus 90. The components may be connected through one or more data transport means. Processor 10 and main memory 20 may be connected via a local microprocessor bus, and the mass storage device 30, peripherals 80, portable storage device 40, and display system 70 may be connected via one or more input/output (I/O) buses.

Mass storage device 30, which may be implemented with a magnetic disk drive or an optical disk drive, is a non-volatile storage device for storing data and instructions for use by processor 10. Mass storage device 30 can store the system software for implementing embodiments of the present technology for purposes of loading that software into main memory 20.

Portable storage device 40 operates in conjunction with a portable non-volatile storage medium, such as a floppy disk, compact disk or digital video disc, to input and output data and code to and from the computing system. The system software for implementing embodiments of the present technology may be stored on such a portable medium and input to the computing system 1 via the portable storage device 40.

Input devices 60 provide a portion of a user interface. Input devices 60 may include an alphanumeric keypad, such as a keyboard, for inputting alphanumeric and other information, or a pointing device, such as a mouse, a trackball, stylus, or cursor direction keys. Additionally, the system 1 as shown in FIG. 12 includes output devices 50. Suitable output devices include speakers, printers, network interfaces, and monitors.

Display system 70 may include a liquid crystal display (LCD) or other suitable display device. Display system 70 receives textual and graphical information, and processes the information for output to the display device.

Peripherals 80 may include any type of computer support device to add additional functionality to the computing system. Peripherals 80 may include a modem or a router.

The components contained in the computing system 1 of FIG. 12 are those typically found in computing systems that may be suitable for use with embodiments of the present technology and are intended to represent a broad category of such computer components that are well known in the art. Thus, the computing system 1 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the technology in the form disclosed. Many modifications and variations will be apparent to those of ordinary skill in the art without departing from the scope and spirit of the technology. Exemplary embodiments were chosen and described in order to best explain the principles of the present technology and its practical application, and to enable others of ordinary skill in the art to understand the technology for various embodiments with various modifications as are suited to the particular use contemplated.

Aspects of the present technology are described above with reference to flowchart illustrations and/or block diagrams of methods, apparatus (systems) and computer program products according to embodiments of the technology. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. An optical device providing an augmented reality display, comprising:
    an augmented image insertion element (AIIE) that reflects a computer generated image (CGI) along a central viewing axis, the CGI being receivable from an image generator optically coupled to the AIIE; and
    a fixed optics lens assembly for coupling a background image with the CGI to create the augmented reality display, the fixed lens assembly comprising:
        a proximal static fixed lens disposed on one side of the AIIE, the proximal fixed lens being fixedly spaced apart from the AIIE at a first distance so that a first air gap is created therebetween;
        a distal static fixed lens disposed on an opposing side of the AIIE from the one side, the distal fixed lens being fixedly spaced apart from the AIIE at a second distance so that a second air gap is created therebetween; and wherein the proximal fixed lens is pre-configured to shift an apparent focal plane of the CGI, and further wherein the distal fixed lens and proximal fixed lens each have a shape and position pre-configured, and wherein a combination of a focusing power of the distal fixed lens, a focusing power of the proximal fixed lens, and a total finite distance between the distal fixed lens and the proximal fixed lens provides zero overall focusing power of the optical device such that a focal plane of the background image is substantially unchanged.

2. The optical device according to claim 1, wherein the proximal lens is pre-configured to shift an apparent focus of the CGI from infinity to a finite distance.

3. The optical device according to claim 1, wherein the proximal lens is further pre-configured to shift a focal power of the background image to account for a prescription of a wearer.

4. The optical device according to claim 1, wherein at least one of the proximal lens and the distal lens comprise diffractive elements.

5. The optical device according to claim 1, further comprising a variable opacity layer disposed between the distal lens and the AIIE to control a relative intensity of the background image.

6. The optical device according to claim 5, wherein the variable opacity layer is segmented into pixels, wherein the pixels can be selectively utilized to transmit or occlude objects within the central viewing axis.

7. The optical device according to claim 1, wherein the distal lens comprises a photochromic or polarized coating that controls a relative intensity of the background image.

8. The optical device according to claim 1, wherein the AIIE comprises an optical waveguide with two parallel surfaces.

9. The optical device according to claim 1, wherein the proximal lens and the distal lens are each plano-spherical.

10. The optical device according to claim 1, wherein the proximal lens comprises a concave surface that faces the AIIE and a concave surface that faces away from the AIIE; and wherein the distal lens comprises a convex surface that faces the AIIE and a second convex surface that faces away from the AIIE.

11. The optical device according to claim 1, wherein the proximal lens and the distal lens are spherical lenses, each one of the spherical lenses comprising two surfaces having different radii of curvature.

12. The optical device according to claim 11, wherein the proximal lens comprises a meniscus lens; and wherein the distal lens comprises a meniscus lens.

13. The optical device according to claim 1, wherein the proximal lens and the distal lens are each plano-aspherical.

14. A device, comprising:
    a frame that is configured to be worn on a head of an individual; and
    an image generator optically coupled to at least one of two optical devices;
    each of the two optical devices disposed on the frame, one of the two optical devices for each eye of the individual, wherein each of the optical devices comprises:
    an augmented image insertion element (AIIE) comprising a waveguide that reflects a computer generated image (CGI) along a central viewing axis, the CGI being receivable from the image generator optically coupled to the waveguide; and
    a fixed optics lens assembly for coupling a background image with the CGI to create the augmented reality display, the fixed lens assembly comprising:
        a proximal static fixed lens disposed on one side of the waveguide, the proximal lens being fixedly spaced apart from the waveguide at a first distance; and
        a distal static fixed lens disposed on an opposing side of the AIIE from the one side, the distal lens being fixedly spaced apart from the waveguide at a second distance;
        and wherein the proximal fixed lens is pre-configured to shift an apparent focal plane of the CGI, and further wherein the distal fixed lens and proximal fixed lens each have a shape and position pre-configured, and wherein a combination of a focusing power of the distal fixed lens, a focusing power of the proximal fixed lens, and a total finite distance between the distal fixed lens and the proximal fixed lens provides zero overall focusing power of the optical device such that a focal plane of the background image is substantially unchanged.

15. The device according to claim 14, wherein each of the two optical devices is disposed at a face form angle $\theta$ relative to a reference axis X that is orthogonal to the central viewing axis.

16. The device according to claim 15, wherein each of the two optical modules is pivoted relative to the central viewing axis according to a pantoscopic tilt angle $\phi$.

17. The device according to claim 16, wherein the pantoscopic tilt angle $\phi$ is set such that the central viewing axis is aligned with a central gaze angle of the eye.

18. The device according to claim 15, wherein the distal lens is plano-convex and the proximal lens is plano-concave.

19. The device according to claim 15, wherein the distal lens has spherical surfaces and the proximal lens is a meniscus lens.

20. An optical device providing an augmented reality display, comprising:
   an augmented image insertion element (AIIE) for reflecting a computer generated image (CGI) along a central viewing axis, the CGI being receivable from an image generator optically coupled to the AIIE; and
   a fixed optics lens assembly for coupling a background image with the CGI to create the augmented reality display, the fixed lens assembly comprising:
      a proximal static fixed lens disposed on one side of the AIIE, the proximal fixed lens being fixedly spaced apart from the AIIE at a first distance so that a first air gap is created therebetween;
      a distal static fixed lens disposed on an opposing side of the AIIE from the one side, the distal fixed lens being fixedly spaced apart from the AIIE at a second distance so that a second air gap is created therebetween; and wherein the proximal fixed lens is pre-configured to shift an apparent focal plane of the CGI, further wherein the distal fixed lens and proximal fixed lens each have a shape and position pre-configured, and wherein a combination of a focusing power of the distal fixed lens, a focusing power of the proximal fixed lens, and a total finite distance between the distal fixed lens and the proximal fixed lens provides zero overall focusing power of the optical device such that a focal plane of the background image is substantially unchanged.

21. The optical device according to claim 20, wherein at least one surface of each of the distal fixed lens and proximal fixed lens is a non-planar surface; and wherein the radii of curvature of each of the non-planar surfaces is pre-configured to correct optical performance at various gaze angles.

22. The optical device according to claim 21, wherein said radii of curvature of each of the each of the non-planar surfaces is optimized to minimize spherical focusing power variation and cylinder focusing power as a function of gaze angle.

23. The optical device according to claim 21, wherein the proximal lens and the distal lens are each plano-spherical.

24. The optical device according to claim 21, wherein the proximal lens comprises a concave surface that faces the AIIE and a concave surface that faces away from the AIIE; and wherein the distal lens comprises a convex surface that faces the AIIE and a second convex surface that faces away from the AIIE.

25. The optical device according to claim 21, wherein the proximal lens and the distal lens are each spherical lenses and wherein each spherical lens comprises two surfaces have different radii of curvature.

26. The optical device according to claim 21, wherein the proximal lens comprises a meniscus lens; and wherein the distal lens comprises a meniscus lens.

27. The optical device according to claim 21, wherein at least one of said non-planar surfaces is a freeform surface.

28. The optical device according to claim 27, wherein said freeform surface is pre-configured according to a non-axisymmetric freeform function.

* * * * *